(12) United States Patent
Matthews et al.

(10) Patent No.: US 7,111,072 B1
(45) Date of Patent: Sep. 19, 2006

(54) PACKET ROUTING SYSTEM AND METHOD

(75) Inventors: Abraham R. Matthews, San Jose, CA (US); Steven Patrick Weir, Petaluma, CA (US)

(73) Assignee: Cosine Communications, Inc., Redwood City, CA (US)

( * ) Notice: Subject to any disclaimer, the term of this patent is extended or adjusted under 35 U.S.C. 154(b) by 1145 days.

(21) Appl. No.: 09/661,636

(22) Filed: Sep. 13, 2000

(51) Int. Cl.
*G06F 15/16* (2006.01)

(52) U.S. Cl. ........................ 709/238; 370/412
(58) Field of Classification Search ................. 370/389, 370/392, 412; 709/202, 203, 200, 238, 242, 709/249, 250
See application file for complete search history.

(56) References Cited

U.S. PATENT DOCUMENTS

| | | | | |
|---|---|---|---|---|
| 4,667,287 A | * | 5/1987 | Allen et al. | 709/234 |
| 5,490,252 A | * | 2/1996 | Macera et al. | 709/249 |
| 5,581,705 A | * | 12/1996 | Passint et al. | 709/200 |
| 5,841,973 A | * | 11/1998 | Kessler et al. | 709/250 |
| 6,047,330 A | * | 4/2000 | Stracke, Jr. | 709/238 |
| 6,175,867 B1 | * | 1/2001 | Taghadoss | 709/223 |
| 6,260,072 B1 | * | 7/2001 | Rodriguez-Moral | 709/241 |

OTHER PUBLICATIONS

Kapustka, K., et al., << CoSine Communications Moves VPNs 'Into the Cloud' with Leading Managed IP Service Delivery Platform, >> CoSine Communications http://www.cosinecom.com/news/pr_5_24.html, 5p., May 24, 1999.*

Kapustka, K., et al., "CoSine Communications Moves VPNs 'Into the Cloud' with the Leading Managed IP Service Delivery Platform", *CoSine Communications* http://www-.cosinecom.com/news/pr_5_24.html, 5 p., (1999).

* cited by examiner

*Primary Examiner*—Marc D. Thompson
(74) *Attorney, Agent, or Firm*—Schwegman, Lundberg, Woessner & Kluth, P.A.

(57) ABSTRACT

A flexible, scalable hardware and software platform that allows a service provider to easily provide internet services, virtual private network services, firewall services, etc., to a plurality of customers. One aspect provides a method and system for delivering security services. This includes connecting a plurality of processors in a ring configuration within a first processing system, establishing a secure connection between the processors in the ring configuration across an internet protocol (IP) connection to a second processing system to form a tunnel, and providing both router services and host services for a customer using the plurality of processors in the ring configuration and using the second processing system. a packet routing system and method is described that includes a processor identifier in each packet to route the packets to a physical processor, and a logical queue identifier to route the packets to the destination object within that processor.

20 Claims, 15 Drawing Sheets

Fig. 4

- EACH SUBSCRIBER HAS A SET OF PARTITIONED VIRTUAL ROUTERS (VRS)
- EACH VR IS THE EQUIVALENT OF AN INDEPENDENT HARDWARE ROUTER
- VR AS AN OBJECT GROUP ENABLES CUSTOMIZED SERVICES PER SUBSCRIBER
- INVISION ALLOWS EASE OF SERVICE PROVISIONING AND MAINTENANCE OF SERVICES ACROSS ALL IPSX UNITS IN A SP NETWORK
- IP NETWORK OPERATING SYSTEM'S (IPNOS) OPEN APPLICATION PROGRAM INTERFACE (API) ENABLES NEW SERVICES TO BE CONTINUALLY ADDED TO THE PLATFORM

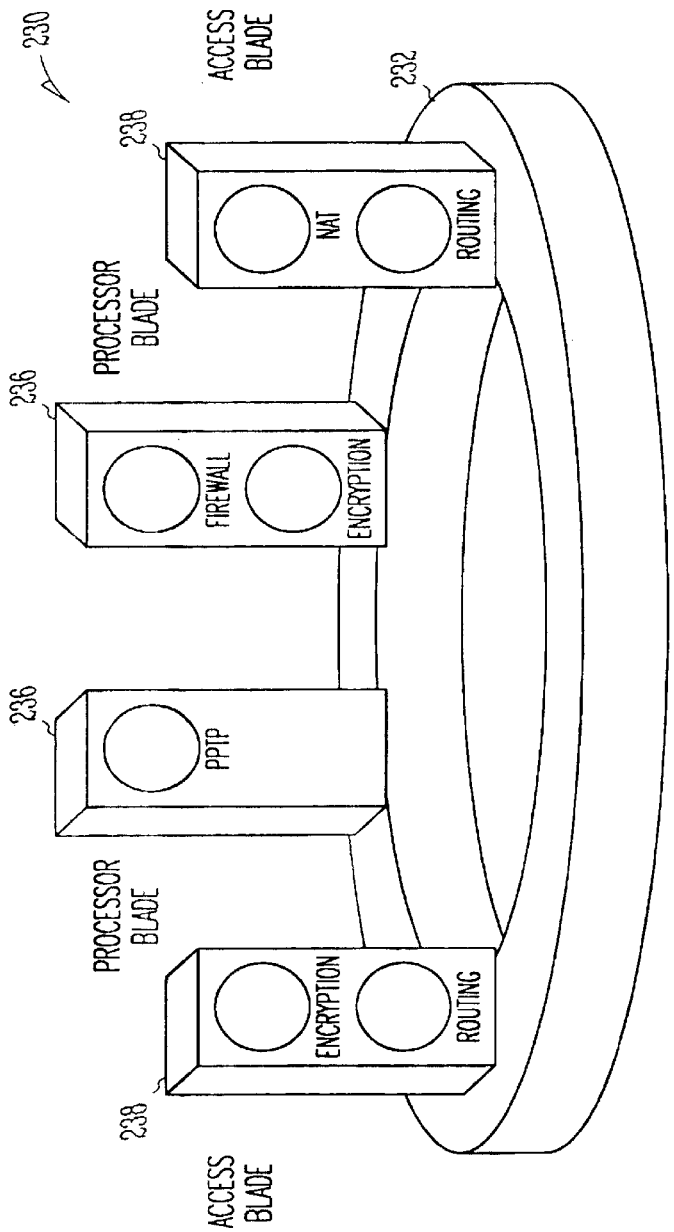

☐ HARDWARE:
▷ 26-SLOT, TWO-SIDED CHASSIS ~831
▷ 22 GBPS PACKET RING MIDPLANE ~832
▷ THREE TYPES OF SERVICE BLADES ~239
  ○ CONTROL ~234
  ○ ACCESS ~238
  ○ PROCESSOR ~236
▷ SPECIALIZED PROCESSING DAUGHTER CARDS FOR SERVICE BLADES
▷ POWER SUPPLY SYSTEM ~240

230

☐ SOFTWARE:
▷ IP NETWORK OPERATING SYSTEM (IPNOS) ~223
▷ VIRTUAL ROUTING ~810
▷ IP SERVICE SUITE ~820
  ○ IPSEC (DIAL AND DEDICATED) ~821       ○ BANDWIDTH MANAGEMENT ~825
  ○ APPLICATION PROXY FIREWALL ~822       ○ MULTIPROTOCOL LABEL SWITCHING (MPLS) ~826
  ○ NETWORK ADDRESS TRANSLATION (NAT) ~823 ○ FRAME RELAY TO IPSEC INTERWORKING ~827
  ○ PPTP TUNNEL TERMINATION ~824

PACKET ROUTING SYSTEM AND METHOD

CROSS REFERENCES TO RELATED INVENTIONS

This application is related to a co-pending commonly assigned application titled "SYSTEM AND METHOD FOR DELIVERING SECURITY SERVICES" by inventor Abraham R. Matthews Ser. No. 09/661,637 and to two provisional applications each titled "SYSTEMS AND METHOD FOR DELIVERING INTERNETWORKING SERVICES" Ser. No. 60/232,577 AND Ser. No. 60/232,516 each filed on even date herewith, all incorporated herein by reference.

FIELD OF THE INVENTION

This invention relates to the field of internet processors, and more specifically to a method and apparatus of delivering security services such as firewalls.

BACKGROUND OF THE INVENTION

The service provider game has grown extremely crowded and fiercely competitive, with numerous players offering similar products and services. While having a large number of comparable services is arguably beneficial to the enterprise, it poses a host of potentially disastrous consequences for a service provider. If all competitors in a given market are offering services that are indistinguishable by the customer base, the burden of differentiation falls squarely on cost, with the least-cost competitor emerging "victorious". Jockeying for the cost-leader position rapidly drives down service pricing, reducing margins to rubble and rendering the service a commodity. Furthermore, numerous offerings that are similar in attributes and cost make it very difficult to lock in customers.

Operational costs also present a significant challenge to service providers. Cumbersome, manual provisioning processes are the primary culprits. Customer orders must be manually entered and processed through numerous antiquated back-end systems that have been pieced together. Once the order has been processed, a truck roll is required for onsite installation and configuration of Customer Premises Equipment (CPE), as well as subsequent troubleshooting tasks. This is a slow and expensive process that cuts into margins and forces significant up-front charges to be imposed on the customer. In order to be successful in today's market, service providers must leverage the public network to offer high-value, differentiated services that maximize margins while controlling capital and operational costs. These services must be rapidly provisioned and centrally managed so that time-to-market and, more importantly, time-to-revenue are minimized. Traditional methods of data network service creation, deployment, and management present significant challenges to accomplishing these goals, calling for a new network service model to be implemented.

Basic Internet access, a staple of service provider offerings, has been commoditized to the point that margins are nearly non-existent. This fact has driven service providers to look for new value-added features and services to layer over basic connectivity so that they are able to differentiate on factors other than cost. The most significant opportunity for differentiation is found in managed network services. Managed network services enable enterprise IT organizations to outsource time-consuming tactical functions so that they can focus strategic core business initiatives.

Enterprise customers are now demanding cost-effective, outsourced connectivity and security services, such as Virtual Private Networks (VPNs) and managed firewall services. Enterprise networks are no longer segregated from the outside world; IT managers are facing mounting pressure to connect disparate business units, satellite sites, business partners, and suppliers to their corporate network, and then to the Internet. This raises a multitude of security concerns that are often beyond the core competencies of enterprise IT departments. To compound the problem, skilled IT talent is an extremely scarce resource. Service providers, with expert staff and world-class technology and facilities, are well positioned to deliver these services to enterprise customers.

While IT managers clearly see the value in utilizing managed network services, there are still barriers to adoption. Perhaps the most significant of these is the fear of losing control of the network to the service provider. In order to ease this fear, a successful managed network service offering must provide comprehensive visibility to the customer, enabling them to view configurations and performance statistics, as well as to request updates and changes. Providing IT managers with powerful Customer Network Management (CNM) tools bolsters confidence in the managed network service provider and can actually streamline the service provisioning and maintenance cycle.

Customer Premises Equipment (CPE)-based Managed Firewall Services

Data network service providers have traditionally rolled out managed network service offerings by deploying specialized CPE devices at the customer site. This CPE is either a purpose-built network appliance that, in addition to providing specific service features, may also serve some routing function, or a mid to high-end enterprise-class server platform, typically UNIX-based. In the case of a managed firewall solution, the CPE device provides services that may include VPN tunnel termination, encryption, packet filtering access control listings, and log files. The CPF at each customer site is aggregated at a multiplexer via leased lines and/or public Frame Relay PVCs (permanent virtual circuits) at the service provider POP (point of presence), then into a high-end access router and across the WAN (wide area network).

In many cases, service providers and enterprise customers find it too expensive and cumbersome to deploy CPE-based security at every site, but rather deploy secure Internet access points at one or two of the largest corporate sites. In this model, all remote site Internet traffic is backhauled across the WAN to the secure access point and then out onto the Internet, resulting in increased traffic on the corporate network and performance sacrifices.

Service providers face significant challenges when deploying, managing and maintaining CPE-based managed firewall services. When a customer expresses interest in utilizing such a service, a consultation with experienced security professionals is required to understand the corporate network infrastructure and site-specific security requirements, yielding a complex set of security policies. This may be accomplished through a set of conference calls or a number of on-site visits. Once the security requirements and policies have been identified, the service provider must procure the CPE device. In some cases, the equipment vendor may provide some level of pre-configuration based upon parameters supplied by the service provider. While CPE vendors are driving towards delivering fully templatized, pre-configured systems that are plug-and-play by enterprise staff, most service providers still assume the responsibility for on-site, hands-on configuration, and a truck-roll to each of the customer sites is necessary. This is particularly true in server-based CPE systems, where a relatively high degree of technical sophistication and expertise is required to install and configure a UNIX-based system.

Typically, a mid-level hardware and security specialist is sent onsite, along with an account manager, to complete the CPE installation and configuration. This specialist may be a service provider employee or a systems integrator/Value-Added Reseller (VAR) who has been contracted by the service provider to complete CPE rollout. This complex process begins with physical integration of the CPE device into the customer network. In the case of a CPE appliance, where the OS and firewall/VPN software components have been pre-loaded, the tech can immediately proceed to the system configuration phase. Server-based CPE services, however, require the additional time-consuming step of loading the system OS and software feature sets, adding a further degree of complexity.

In the configuration phase, the tech attempts to establish contact between the CPE device and central management system at the service provider NOC (network operations center). In cases where the device has not been previously assigned an IP address, an out-of-band signaling mechanism is required to complete the connection, typically a modem and a POTS line. If the integration process has been successful, NOC staff should be able to take over the process, pushing specific policy configurations (and possibly an IP address) down to the CPE device through a browser-driven management interface. This entire process must be repeated for every enterprise site utilizing the managed firewall service.

Additionally, maintenance processes and costs for CPE-based managed firewall services can also be overwhelming to both the service provider and enterprise customers. Enterprises are forced to either keep cold spares onsite or be faced with periods of absent security when their firewall fails, a situation that is unacceptable to most of today's information intensive corporations. Service providers must have an inventory of spares readily available, as well as staff resources that can, if necessary, go onsite to repeat the system configuration process. Troubleshooting thousands of CPE devices that have been deployed at customer sites is an extremely formidable challenge, requiring extensive call center support resources, as well technicians that can be quickly deployed onsite.

As CPE-based firewall services have traditionally been deployed in private enterprise networks, the original management systems for these devices have difficulty scaling up to manage several large, multi-site service provider customers. CPE device vendors are scrambling to ramp up these systems to carrier-grade and scale. Firewall management systems are typically GUI-based (graphical user interface-based), browser-driven interfaces that run on industrial grade UNIX platforms in the service provider NOC. The management system interfaces with the CPE devices based on IP address. The CPE-based managed firewall model faces service providers with another issue: capital costs. In addition to the significant costs required to build out a POP/access infrastructure, including multiplexers and high-capacity access routers, the service provider must also assume the initial costs of the CPE device, including firewall and VPN software licensing charges. In many cases, these costs are passed on to the customer. This creates steep up-front costs that, coupled with per-site installation charges, can present a serious barrier to service adoption. In markets where several service providers are offering managed firewall services, a service provider may absorb the CPE cost to obtain a price leadership position, cutting deeply into margins.

The CPE-based model is also limited when rolling out services beyond the managed firewall offering. New services, such as intrusion detection, may require additional hardware and/or software. This results in higher capital costs, as well as another expensive truck roll.

Thus, there is a need for a method and apparatus of delivering a variety of network services, for example security services such as firewalls.

SUMMARY OF THE INVENTION

The present invention provides a flexible, scalable hardware and software platform that allows a service provider to easily provide internet services, virtual private network services, firewall services, etc., to a plurality of customers. This solution can be changes to provision each customer with more or less processing power and storage, according to individual changing needs. a packet routing system includes a processor identifier as part of each packet to route the packets to a physical processor, and a logical queue identifier to route the packets to the destination object within that processor.

One aspect of the present invention provides a method of packet routing. The method includes connecting a plurality of processors in a network, assigning a unique processor identifier (PEID) to each of the processors, routing a first packet to a first one of the processors across the network, wherein each such packet includes a PEID value corresponding to a PEID of one of the processors, and wherein the routing to the first processor is based on the PEID value in the first packet, establishing a plurality of objects: in the first processor, assigning a logical queue identifier (LQID) to a first one of the objects in the first processor, wherein each packet also includes an LQID value corresponding to an LQID of one of the objects, and routing the first packet to the first object based on the LQID value in the first packet.

Another aspect of the present invention provides a system for routing packets. This system includes a plurality of processors coupled to one another using a network, wherein each of the processors a unique processor identifier (PEID), wherein a first packet is routed into a first one of the processors across the network, wherein each such packet includes a PEID value corresponding to a PEID of one of the processors, and wherein the routing to the first processor is based on the PEID value in the first packet, a plurality of objects in the first processor, wherein each such object is assigned a logical queue identifier (LQID), wherein each packet also includes an LQID value corresponding to an LQID of one of the objects, and software for routing the first packet to the first object based on the LQID value in the first packet.

Still another aspect of the present invention provides a system for routing packets. This system includes a plurality of processors coupled to one another using a network, wherein each of the processors a unique processor identifier (PEID), wherein a first packet is routed into a first one of the processors across the network, wherein each such packet includes a PEID value corresponding to a PEID of one of the processors, and wherein the routing to the first processor is based on the PEID value in the first packet, and a plurality of objects in the first processor, wherein each such object is assigned a logical queue identifier (LQID), wherein each packet also includes an LQID value corresponding to an LQID of one of the objects, wherein the first packet is routed to the first object based on the LQID value in the first packet.

BRIEF DESCRIPTION OF THE DRAWINGS

FIG. 4 is a block diagram of one embodiment of the present invention, a system 400 providing a plurality of virtual private networks 410, 420, 430, 440.

FIG. 5 is a block diagram of one embodiment of the present invention, a ring-network hardware platform 230.

FIG. 8 is a block diagram of one embodiment of the present invention, hardware elements 230 and software elements 220.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

In some embodiments, the present invention deploys one or more virtual private networks (VPNs) running on one or more carrier-class platforms that scale to provide cost-effective solutions for internet service providers (ISPs). In particular, security services such as firewalls can be provided by the ISPs for services they provide to their customers, wherein a plurality of customers are hosted on a single network of processors. An ISP is providing hosting services (e.g., hosting an internet web site for a customer) and routing (moving data to and from the internet) for their customers.

Figure 1:
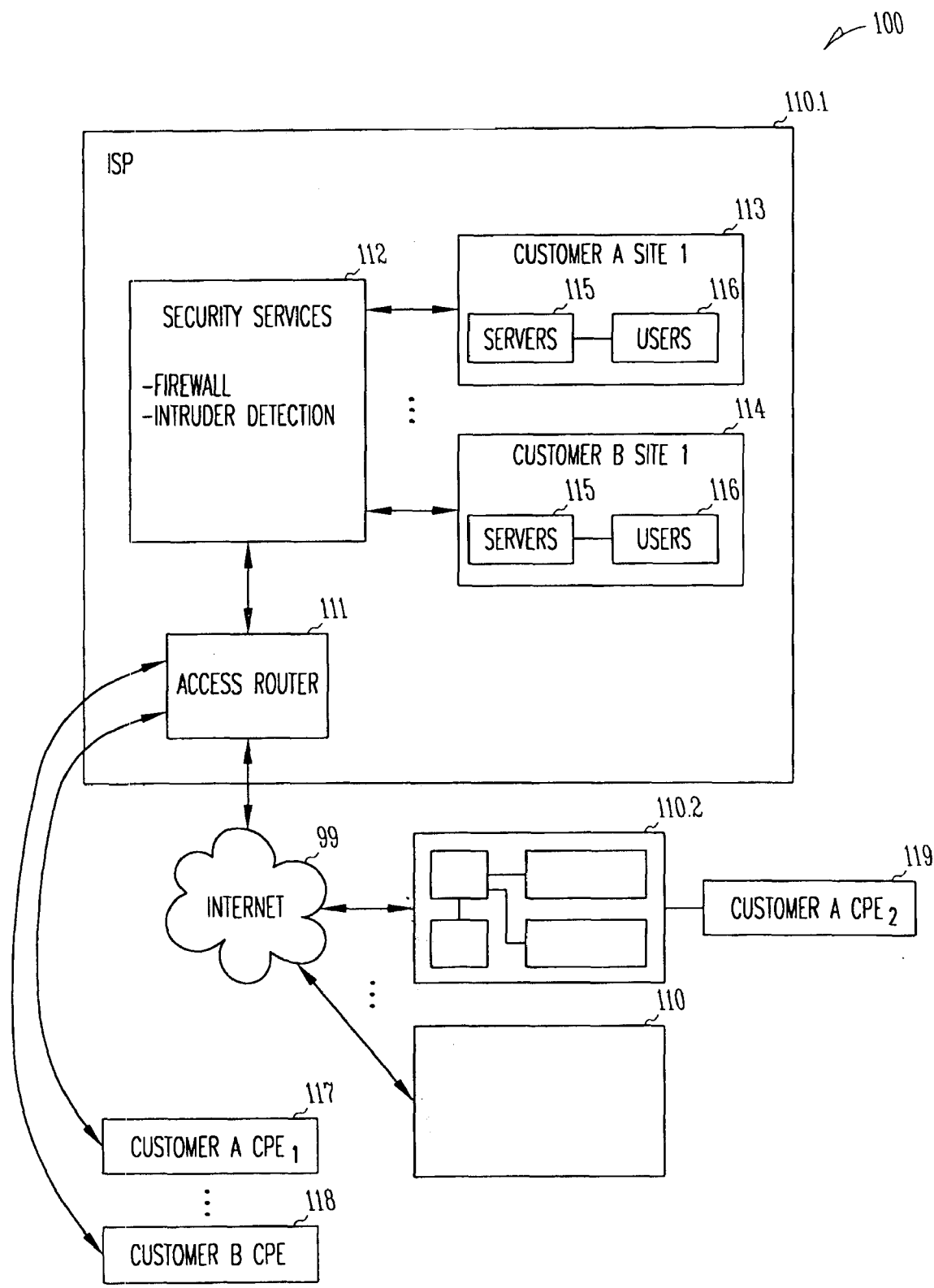
FIG. 1 is a block diagram of one embodiment of the present invention, system 100 having a plurality of ISP boxes 110 connected to the internet 99

FIG. 1 shows one embodiment of the present invention having a system 100 that includes a plurality of similar ISP (internet service provider) boxes 110 connected to the internet 99. In this embodiment, each box 110 represents a subsystem having routing services provided by a block called access router 111, and hosting services provided by blocks 113 and 114. The ISP is typically a company that provides internet services (such as connectivity to the internet, as well as servers that store data and provide data according to requests by users, and network connectivity to users) to a plurality of customers including customer a and customer B. In some embodiments, customer premises equipment 117 and 118 (also called CPE 117 and 118, this is hardware and the software that controls the hardware, that is installed at the customer's premises; this can include servers, routers and switches, and the network connecting to individual user's workstations, and various interfaces to external communications networks) is used to provide at least a portion of the function to support customers a and B respectively, and the ISP 110 provides the rest in blocks 113 and 114 respectively. The function to support customers includes such things as web site hosting, database and other servers, e-mail services, etc. The customer's CPE 117 and 118 connect to the ISP through, e.g., access router 111 and security services 112 to customer a site one 113 and customer B site one 114, and also to the internet 99 in a manner that isolates customer a and customer B from one another except for communications and E-mail that would normally pass across the internet 99.

Further, by establishing secure connections between two ISP boxes 110 across the internet 99, a virtual private network or VPN 410 (see FIG. 4 below) can be created. This function allows, for example, customer a's office at a first site (e.g., headquarters 117) to connect seamlessly to customer a's office at a second site (e.g., branch office 119) using what appears to them as a private network, but which actually includes some CPE at site 117, some services 113 provided within ISP 110.1, a secure encrypted connection across internet 99, some services also in ISP 110.2, and some CPE at site 119. Users at sites 117 and 119 can communicate with one another and share data and servers as if they were on a single private network provided by, e.g., VPN 410.

Figure 2:
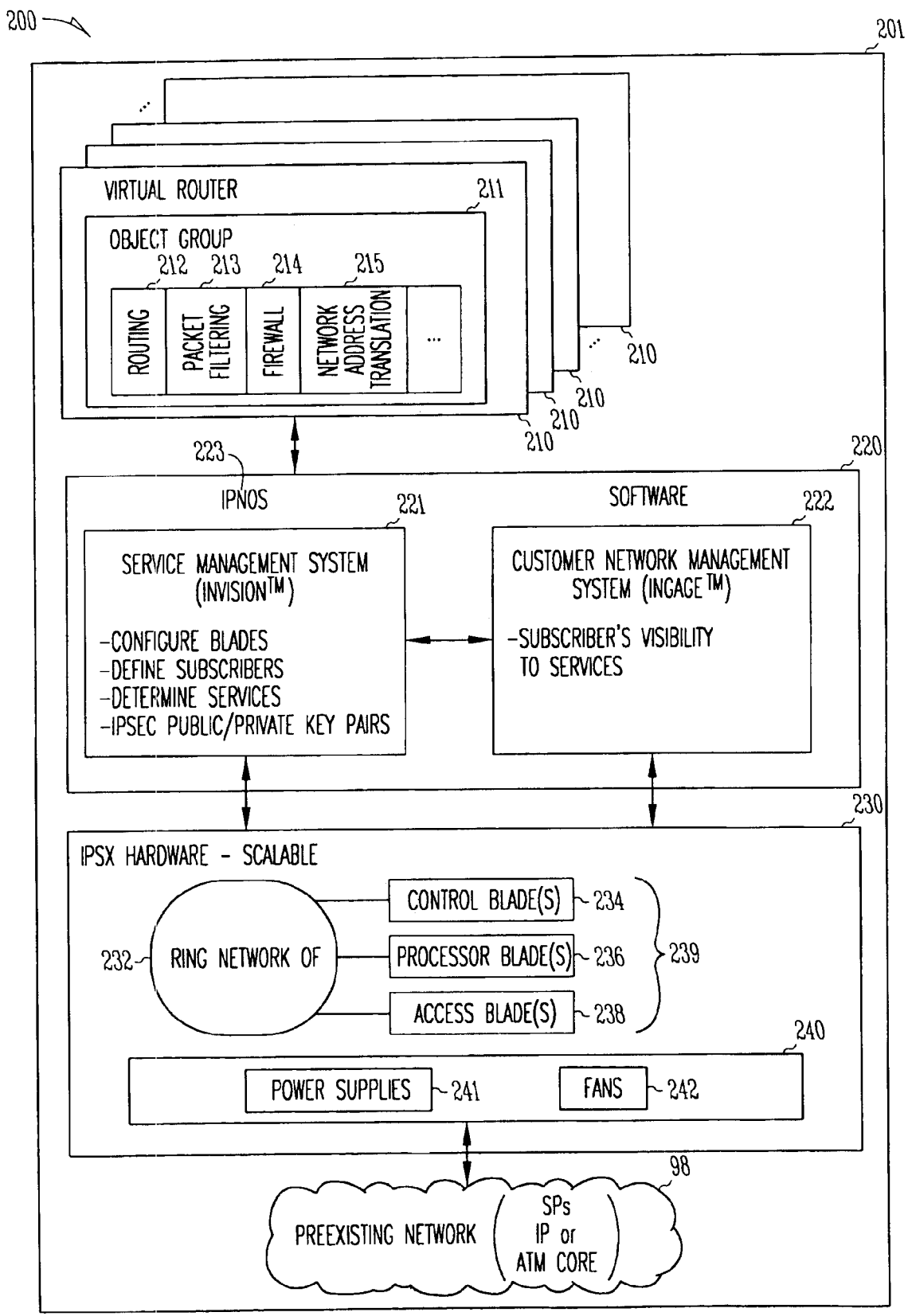
FIG. 2 is a block diagram of one embodiment of the present invention, service provider network 200.

FIG. 2 is a block diagram of one embodiment of the present invention, service provider (SP) network 200. a conventional network "cloud" 98 includes the SP's internet protocol (IP) or asynchronous transfer mode (ATM) core, as is well known in the internet art. IP system 20.1 connects to such existing infrastructure 98, as well as to other optional conventional hardware such as described in FIG. 2 below, to provide SP network 200. System 201 provides hardware 230 and software 220 to provide a plurality of virtual routers (VRs) 210. Each VR 210 provides support for router services and server services such as those that provide customer site services 113 of FIG. 1. Each VR 210 is supported by an object group 211, which is a group of generally dissimilar objects such as routing object 212, packet filtering object 213, firewall object 212, network address translation (NAT) object 215, and/or other objects. In some embodiments, each VR 210 is a separate instantiation.

In some embodiments, software 220 includes IP network operating system (IPNOS) 223, service management system (SMS) 221 (e.g., in some embodiments, this is the InVision™ software from CoSine Communications Inc., assignee of the present invention), and customer network management system (CNMS) 222 (e.g., in some embodiments, this is the InGage™ software from CoSine Communications Inc., assignee of the present invention).

SMS 221 provides such services as configuration of blades 239, defining subscribers, determining services, and generation of IP security (IPSec) public/private key pairs. CNMS 222 provides such services as providing subscribers (customers) visibility to services. In some embodiments, CNMS software runs at least in part in a user's CPE or workstation, typically at a company's information services (IS) headquarters.

In some embodiments, IP server switch (IPSX) hardware 230 includes one or more scalable hardware enclosures, each having a plurality of service "blades" 239 (i.e., an insertable and removable printed circuit card having one or more processors, each having its own CPU and memory) each connected in a ring configuration (such as a counter-rotating dual ring 232). In some embodiments, three types of blades 239 are provided: control blade(s) 234, processor blade(s) 236, and access blade(s) 238. IPSX hardware also includes highly available, redundant, and hot-swappable hardware support 240 including power supplies 241 and fans 242.

Figure 3:
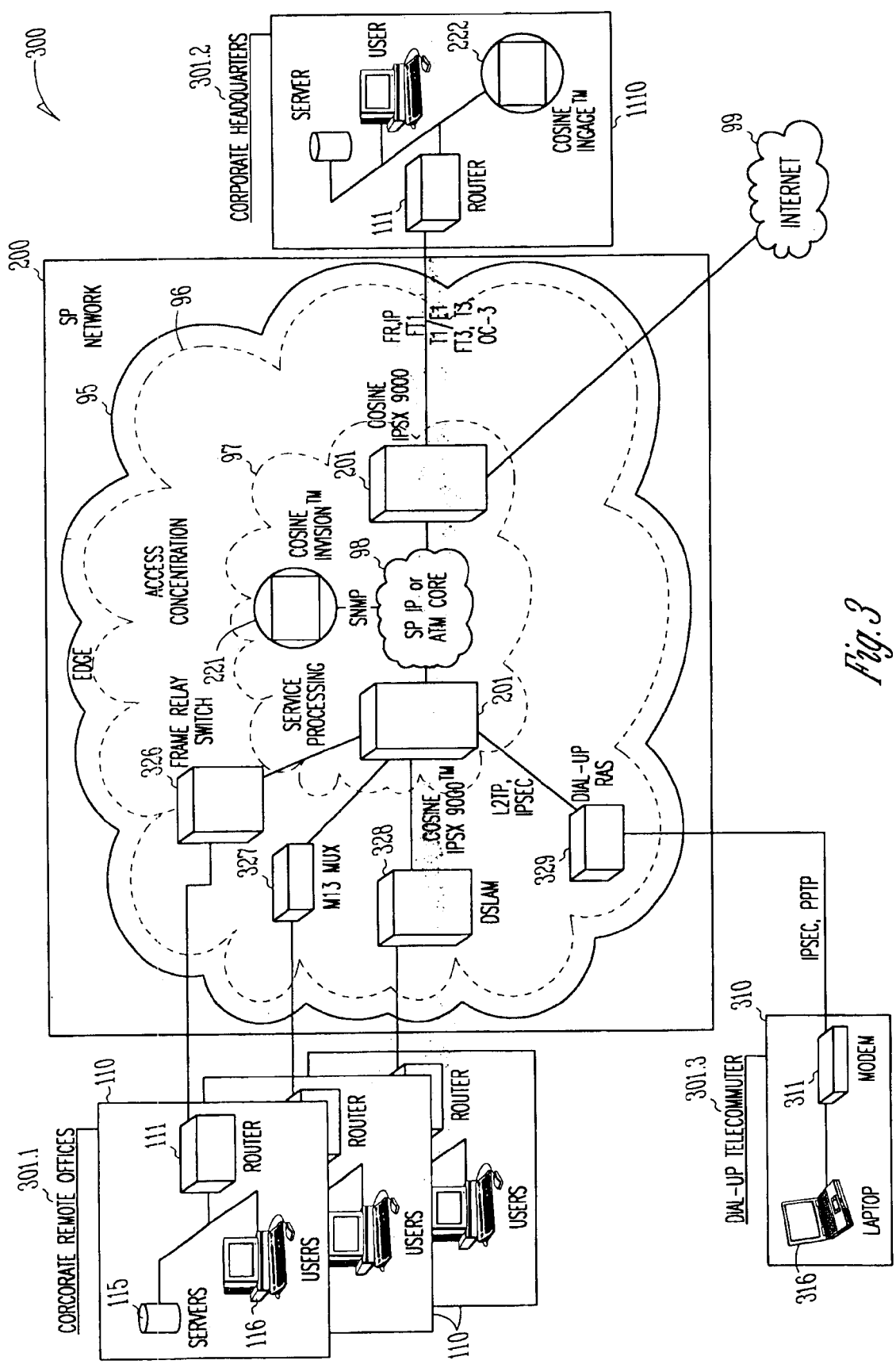
FIG. 3 is a block diagram of one embodiment of the present invention, an IP service delivery platform 300.

FIG. 3 is a block diagram of one embodiment of the present invention, an IP service delivery platform (IPSDP) 300. The hardware and software of SP network 200 can be viewed as generating various network "clouds" such as edge cloud 95, access concentration cloud 96, and service processing cloud 97. These are built upon the existing conventional SP's IP or ATM core cloud 98 and they connect to the external internet cloud 99. IPSDP 300 includes an ISP's SP network 200 connected to one or more customer's offices 301 each of which includes some amount of CPE 110. In the embodiment shown, three corporate remote offices 301.1 are connected to SP network 200 using various conventional communications devices, well known to the art, such as frame relay switch 326, M13 multiplexor (mux) 327, DSLAM (digital subscriber link access multiplexor) 328, and dial-up RAS (remote access server) 329 (used to receive dial-up connections, for example, from the modem 311 connected to laptop computer 316 in portable system 310 of dial-up telecommuter 301.3). In the embodiment shown, SP network 200 includes two systems 201, on connecting through frame relay switch 326, M13 multiplexor (mux) 327, DSLAM 328, and dial-up RAS 329 to remote office's CPE 110, and the other connecting directly to the customer's corporate headquarter's CPE 1110 (which also includes a control and monitoring function provided by CNMS 222) using conventional communications protocols such as frame relay (FR, an access standard defined by the ITU-T in the I.122 recommendation "Framework for Providing Additional Packet Mode Bearer Services"), internet protocol (IP), FT1 (fractional T1), T1/E1(a digital transmission link with capacity of 1.544 Megabits per second), FT3 (fractional T3), T3 (capacity of 28 T1 lines), and/or OC3 (optical carrier level 3=three times the OC1 rate of 51.840 Mbps)(each of which is a conventional communications service well known to the art).

In some embodiments, IPDSP 300 provides a VPN 410, using secure connections across the internet 99, to connect remote offices 301 to one another.

FIG. 4 is a block diagram of one embodiment of the present invention, a system 400 providing a plurality of virtual private networks 410, 420, 430, 440. VPNs 420, 430, and 440 are each equivalent to the VPN 410 that supports subscriber 1, except that they are for other subscribers. Each subscriber has a set of partitioned virtual routers 210. For example, subscriber I has two locations, 411 and 412, connected in a VPN 410. VR 210at location 411 can include some CPE 110 as well as support provided in system 201-1. VR 210 at location 412 can include some CPE 110 as well as support provided in system 201-2. These two VRs 210 establish a "tunnel," a secure connection, that allows them to maintain secure communications that support the VPN 410 even across packet networks such as the internet 99. Each VR 210 is the equivalent of an independent hardware router. Since each VR 410 is supported by an object group 211 objects can be easily added or omitted to enable customized services on a subscriber-by-subscriber basis to meet each subscribers individual needs. SMS 221 running on SP network 200 allows ease of service provisioning (dynamically adding additional processors/processing power when needed, reducing the processors/processing power used for VPN 410 when not needed). In some embodiments, IPNOS 223 uses an open Application Program Interface (API) to enable new services to be added to the platform whenever needed.

In some embodiments, system 401 at a first site (e.g., an ISP premises locally connected to a customer office) includes IPSX 201-1 having a VR 210 connected to CPE 117. This system 401 appears to the outside world as a single router having firewall services, server(s) and user(s), etc. These functions can be provided by either or both VR 210 and CPE 117, thus allowing a customer to outsource many or most of these services to the service provider and IPSX 201-1. Similarly, system 402 at a second site (e.g., another ISP premises locally connected to a remote office of the same customer) includes IPSX 201-2 having a VR 210 connected to CPE 119. This system 402 also appears to the outside world as a single router having firewall services, server(s) and user(s), etc. These functions can be provided by either or both VR 210 and CPE 119, thus allowing a customer to outsource many or most of these services to the service provider and IPSX 201-2.

FIG. 5 is a block diagram of one embodiment of the present invention, a ring-network hardware platform 230. Hardware platform 230 includes plurality of service "blades" 239 (i.e., an insertable and removable printed circuit card having one or more processors, each having its own CPU and memory) each connected in a ring configuration (such as a counter-rotating dual ring 232). In some embodiments, three types of blades 239 are provided: control blade 234 (not shown here), processor blades 236 (providing such functions as point-to-point (PPTP) connectivity, firewall protection against hacking, intruders, or accidental access), and access blades 238 (providing such functions as NAT, encryption, and routing).

Figure 6:
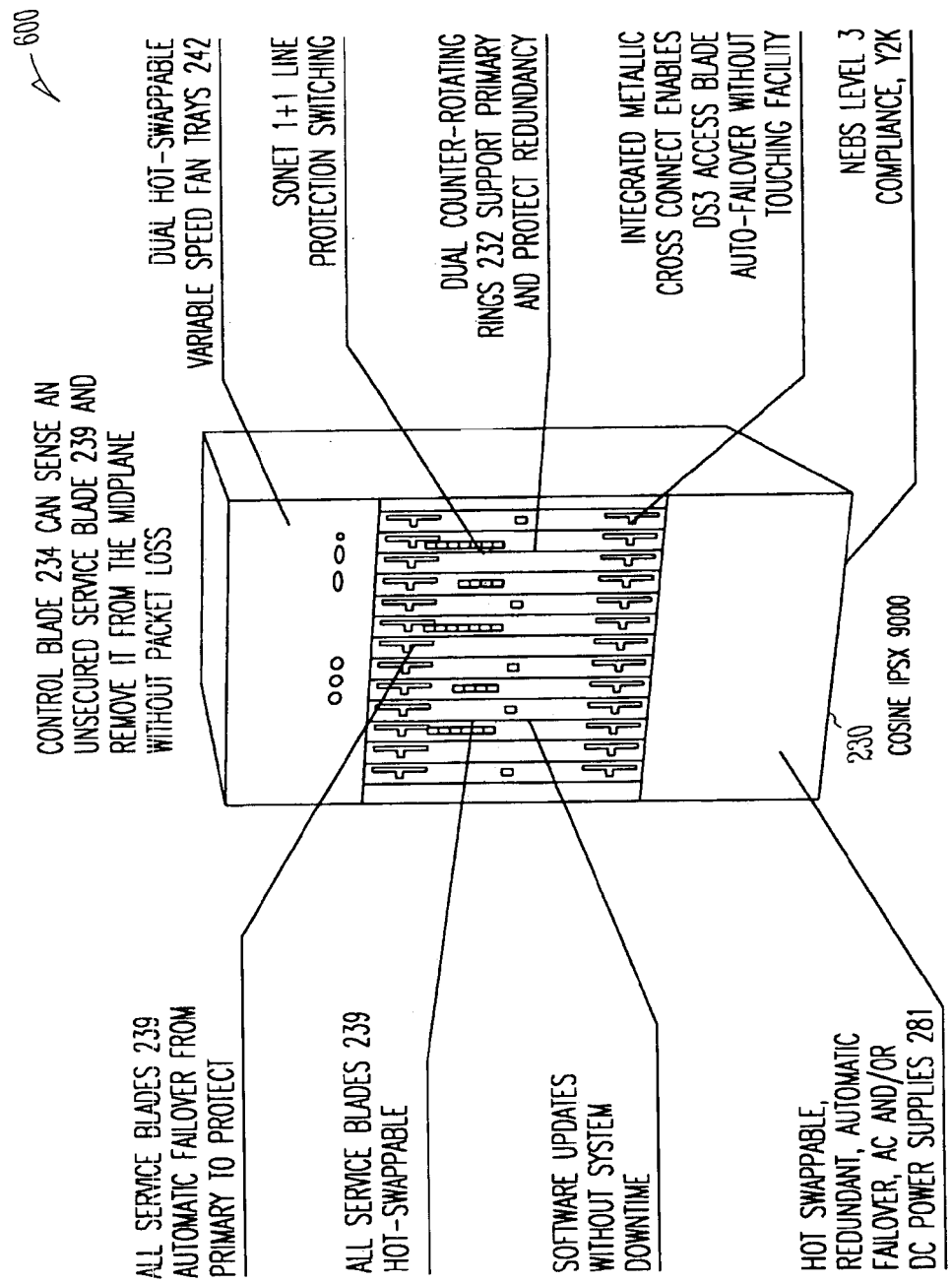
FIG. 6 is a block diagram of one embodiment of the present invention, service processing switch 600.

FIG. 6 is a block diagram of one embodiment of the present invention, service processing switch 600. In some embodiments, service processing switch 600 includes a hardware enclosure 230 having power supplies 241 that are hot-swappable, redundant, capable of automatic failover (when one fails, others take over), and which can be AC or DC sourced. In some embodiments, dual hot-swappable, variable speed fans 242 are provided. In some embodiments, software updates can be made without system downtime by swapping out all object groups 211 (virtual routers), changing the software modules, and then resuming processing. In some embodiments, all service blades 239 are hot-swappable (they can be removed and/or inserted without bringing the system down) and include automatic failover from primary mode to protect mode. In some embodiments, dual counter-rotating rings 232 support primary and protect redundancy. In some embodiments, system 600 provides NEBS Level 3 compliance and is Y2K ready, provides SONET (synchronous optical network) 1+1 Line Protection Switching, and includes integrated metallic cross-connects to enable DS3 (digital signal level 3; 44,736,000 bits per second) blade automatic failover without touching the facility.

Figure 7:
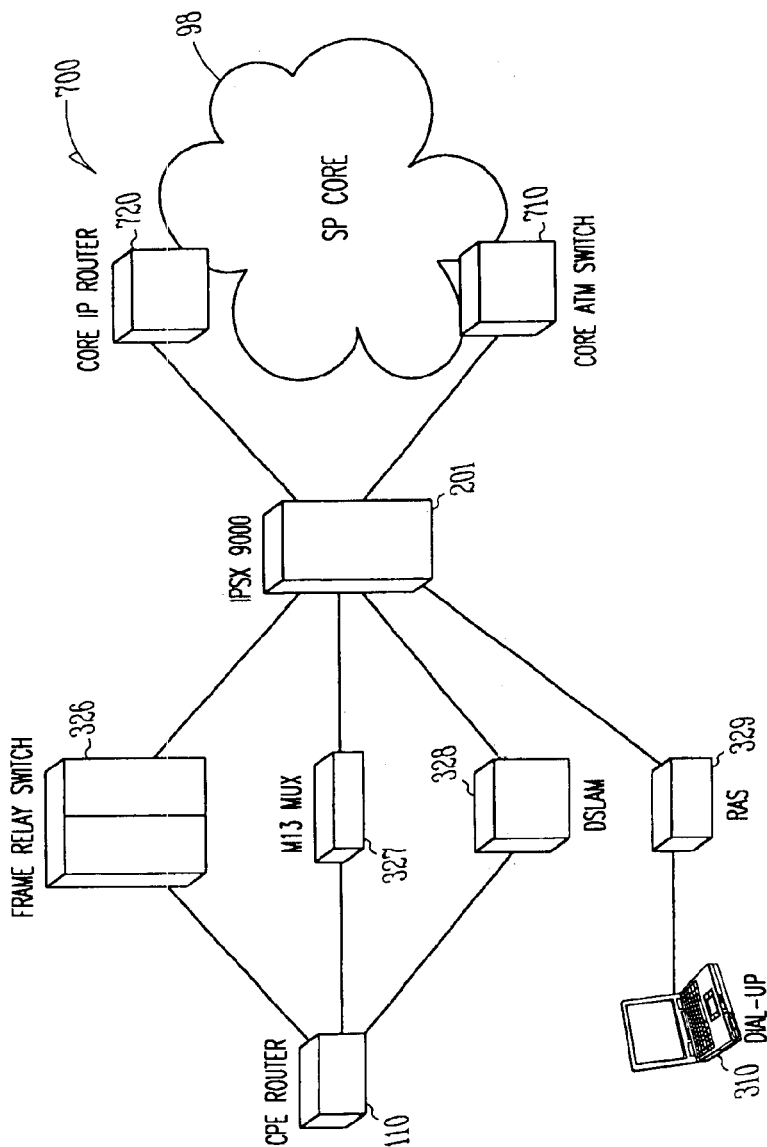
FIG. 7 is a block diagram of one embodiment of the present invention, an integrated system 700 including conventional existing network elements.

FIG. 7 is a block diagram of one embodiment of the present invention, an integrated system 700 including conventional existing network elements. Integrated system 700 optionally includes conventional frame relay switch 326, M13 mux 327, DSLAM (DIGITAL SUBSCRIBER LINK ACCESS MULTIPLEXOR) 328, and RAS (REMOTE ACCESS SERVER) 329 connecting to customer's equipment such as CPE router 110 and dial-up system 310. In some embodiments, integrated system 700 optionally includes a core IP router 720 and/or a core ATM switch as part of an SP core 98. This provides support for a large number of conventional technology standards, and interoperability with existing access-concentration and core-network elements. It also offers interworking between frame-relay networks and IP networks. Network address translation (NAT) enables enterprise subscribers to leave their network addressing untouched. It also enables one to merge IP and legacy networks into one, with continuity of service (COS) guarantees.

FIG. 8 is a block diagram of one embodiment of the present invention, hardware elements 230 and software elements 220. Hardware elements 230 include a 26-slot, two-sided chassis 831 having a 22-gigabit per second (Gbps) ring midplane 832. Service blades 239 can be hot plugged into midplane 832 form either side of chassis 831. Three types of service blades 239 are provided: control blades 234, processor blades 236, and access blades 238. In some embodiments, four processors are provided on each service blade 239,each processor having a CPU and its own memory, allowing specialized processing to be performed on various different daughter cards of the blades 239.

In some embodiments, a single system chassis 831 provides a redundant back plane and blade-termination facilities 832. The access blades 238, processor blades 236, control blades 234, power supplies 241 and fan trays 242 are designed for hot-swappable operation—any of these components may be removed from service while the entire system remains operational. The metallic cross connect is a passive system that provides fail-over support to allow DS3 and DS1 access facilities to be switched from one access blade to another access blade should an access port or card fail. The phase 1 chassis provides 26 universal slots, each of which may be populated with control blades, access blades, and processor blades. To operate, the chassis must contain at least one control blade. Up to two control blades may be operational in a chassis at the same time. Access blades are added as input/output requirements grow, and processor blades are added as computation requirements scale.

In some embodiments, each system 230 supports up to twenty-five processing blades (PB) 236. Each processor blade 236 is designed to support three hundred Mbps of full duplex traffic while delivering IP services including application firewall, LT2P, PPTP, NAT VPN router.

In some embodiments, each system 230 supports up to two control blades (CB) 234. CBs 234 provide overall system supervision, IP route calculation, software update management, and network management statistics logging services. When two CBs 234 are operational within a chassis 831, they remain synchronized such that should either CB 234 fail, the other CB 234 automatically takes over system operation. In this process all active services remain in progress. Each control blade 234 is hot swappable, so that when proper procedures are followed, a failed or malfunctioning CB 234 may be removed from on operational system 230 without bringing down any customer services.

In some embodiments, each CB 234 provides four Ethernet interfaces for management traffic. Each Ethernet interface has a distinct collision domain and may each be configured with a primary and secondary IP address. Ethernet interfaces designated for management use may be configured for primary and protected configurations, both sharing the same IP address, reducing ISP IP address requirements. The CB 234 Ethernet interfaces may be configured for fully meshed communications over diverse paths to diverse operating systems. Each CB 234 is also equipped with a random # seed generator for use in security applications.

In some embodiments, each system 230 supports up to twenty-five access blades (AB) 238. Access blades 238 provide physical line termination, hardware-assisted IP forwarding, hardware assisted encryption services, and hardware assisted queue management. Each access blade 238 is hot swappable, so that when proper procedures are followed, a failed or malfunctioning ab may be removed from on operational system 230 without bringing down any customer services. In some embodiments, 10/100 Ethernet-, DS3-, and OC3-type access blades are supported by system 230.

Figure 9:
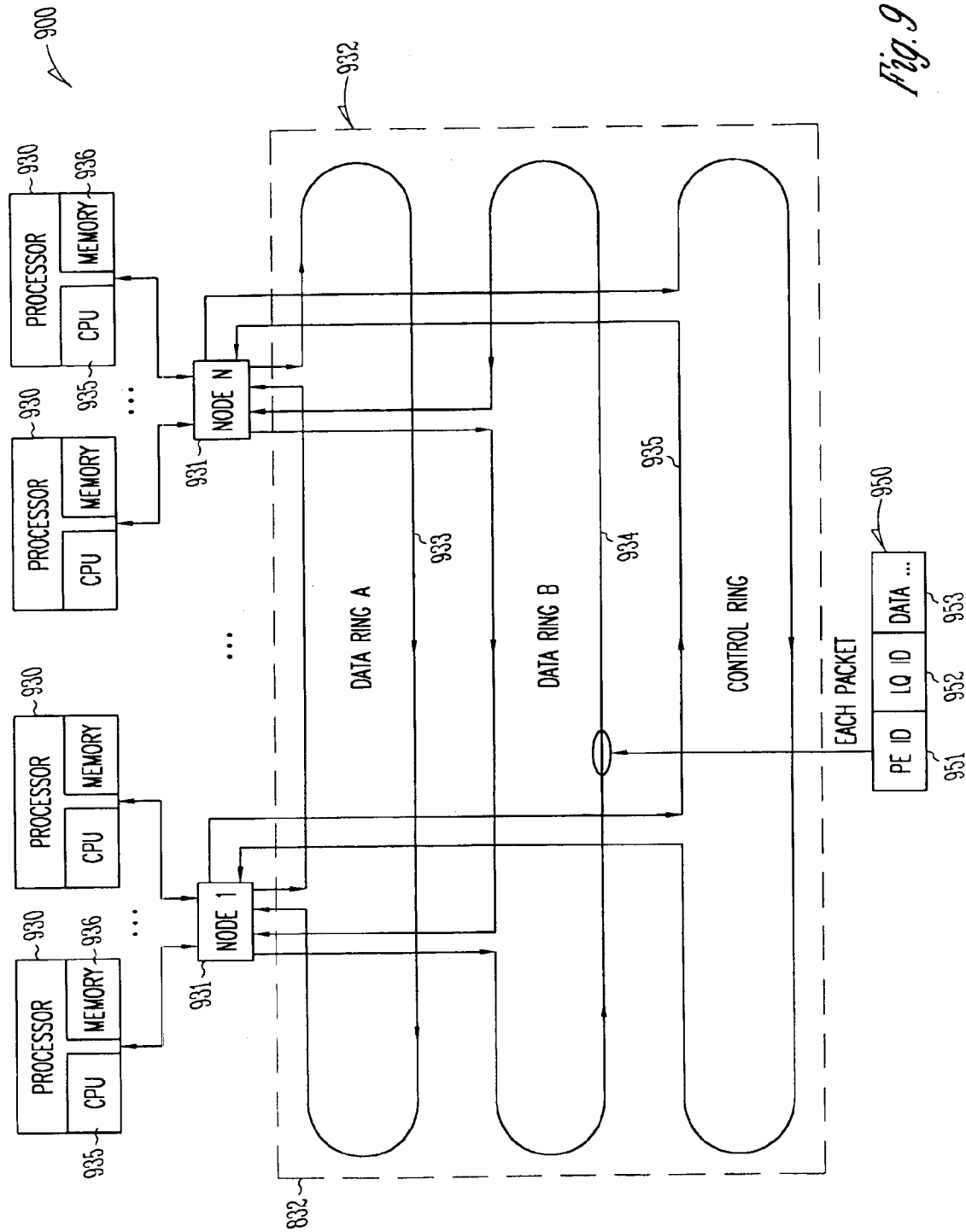
FIG. 9 is a block diagram of one embodiment of the present invention, multiprocessor system 900 using ring network 932.

FIG. 9 is a block diagram of one embodiment of the present invention, multiprocessor system 900 using ring network 932. In some embodiments, each of two network rings 933 and 934 connect nodes 931 together, where each blade 239 includes one or more nodes 931, and each node 931 is connected to one or more processors 930. In one embodiment, each blade 239 includes four nodes 931, each having one processor 930. Each processor 930 include its own CPU (central processing unit) 935 and memory 936, and optionally includes other hardware such as routers, encryption hardware, etc. Software tasks, in some embodiments, are split up such that one processor operates on one part of the data (e.g,. the Level 7 processing) and another processor operates on another part of the data (e.g., the Level 3 processing). In other embodiments, the various processing portions of a task all run on a single processor, multiprocessing with other tasks that share that processor. Thus, the hardware provides scalability, where low-end systems include few processors that do all the work, and high-end systems include one hundred or more processors and the work is distributed among the processors for greater speed and throughput. In some embodiments, the plurality of processors 930 in the ring configuration includes forming dual counter rotating ring connections 933 and 934, each connecting to each of the plurality of processors 930. In some embodiments, each processor is a high-performace processor such as an RI 2K processor from MIPS Corporation.

In some embodiments, a separate control ring 935 is provided, connected to all processors 930. Data passed on the control ring 935 allows control communications to be passed between processors, and in particular, allows the control blade to configure and control the other blades in IPSX 201. In other embodiments, ring 935 is omitted, and its function is overlaid on rings 933 and 934.

Logical Queue Identifiers

In some embodiments, rings 933 and 934 are packet-passing rings. Each packet 950 placed in the rings includes a data portion 953 and a processor element identifier (PEID 951) that identifies for each node 931 which processor that packet is destined for, for example a 16-bit PEID that specifies one of 65526 PEs. If the PEID matches a processor on its particular node, the node 931 passes the packet to the proper processor 930; if not, the packet is forwarded to the next node 931. In some embodiments, each packet also includes a logical queue identifier (LQID) that identifies a software entity (for example, an object group for a particular VR 210) residing on that processor 930 for which the packet is destined.

In some embodiments, every node 931 has a unique, globally unique (i.e., unique within an IPSX 201, or within an ISP having a plurality of IPSXs 201) PEID 951. In some embodiments, the way this is done is that one takes the blade ID (e.g., five bits) and you append the PE number, which is, for example, a eleven bits. Put that together in some fashion and you'll get a unique ID that is globally unique within some hardware configuration. Note that packets including this PEID 951 are routable. Just by looking at the PEID 951, the system 201 has a topological structure so that it can route based on purely the PEID 951. The next thing to keep in mind is that system 201 is managing multiple virtual context. Each VR 210 in a system 201 is a virtual router to which packet are to be directed. When packets come into node N 931 for example, system 201 needs to be able to steer it to the appropriate logical entity, i.e., to the appropriate context an to the object channel that it represents. Thus, a logical queue ID 952 is appended that is unique within the destination processor (PE) 930. If an object in a processor 930 on node 1 930 wants to set up a channel to another object a processor 930 on node N 930, they need to use the LQID 952. a first LQID 952 and PEID 951 together represent the local end, and a second LQID 952 and PEID 951 together represent the remote end of the object and so the system can map the corresponding object channel, defining the object channel that is going across the network. From a networking perspective, PEID 951 looks like your IP address that routes packets like an IP address. But once you go to a particular node 931, the LQID looks like the UDP (User Datagram Protocol, a TCP/IP protocol describing how messages reach programs within a destination computer) code number. So system 201 (e.g., SMS 221) essentially signals and negotiates the proper LQID to have a channel going between those ends. This allows all the traffic coming into a PE 930 to be steered along the appropriate object path to the appropriate object channel on that object.

In some embodiments, an object could be talking on another channel to another object, or to the same object, using a different channel. In which case each channel uses a different LQID 952, but the same PEID 951.

In some embodiments, system 201 sets up a shortcut that circumvents traffic that otherwise would be transmitted outside system 201 and then back in (e.g., traffic between two different VRs 210 supporting different customers). To set up such a shortcut, system 201 allocates a different LQID 952 for the shortcut. Thus, an object channel has the normal point-to-point path for normal traffic and has a multi-point-to-point path which is used for shortcut traffic. So when packets come in to the object it knows whether the packet came in on the normal path or on the shortcut path. Similarly, when the object wants to use a shortcut, it also needs to allocate a different LQID for its outbound shortcut traffic. One interesting distinction of shortcut paths is that the normal point-to-point is bidirectional and data can flow in both directions, but shortcuts data flow flows in only one direction. So a receive site can have any number of transferred sites. Any number of objects can be transmitting to the same receive site. That is why it is called multi-point-to-point.

Further, some embodiments have different levels of shortcuts. For example, a packet can be sequentially passed to successive destinations in some embodiments. Thus there can be a complex multistage path. The shortcuts can trickle down to the ultimate end, where the packet cascades. Further, if one object knows a shortcut, it can tell other objects about its shortcut. So the other object does not have to come to the first object and then be directed to the shortcut destination, but rather can directly use the shortcut it has learned about.

While service providers recognize the tremendous revenue potential of managed firewall services, the cost of deploying, managing and maintaining such services via traditional CPE-based methods is somewhat daunting. Service providers are now seeking new service delivery mechanisms that minimize capital and operational costs while enabling high-margin, value-added public network services that are easily provisioned, managed, and repeated. Rolling out a network-based managed firewall service is a promising means by which to accomplish this. Deploying an IP Service Delivery Platform in the service provider network brings the intelligence of a managed firewall service out of the customer premises and into the service provider's realm of control.

An IP Service Delivery Platform consists of three distinct components. The first is an intelligent, highly scalable IP Service Processing Switch. Next is a comprehensive Service Management System (SMS) to enable rapid service provisioning and centralized system management. The last component is a powerful Customer Network Management (CNM) system which provides enterprise customers with detailed network and service performance systems, enable self-provisioning, and eases IT managers fears of losing control of managed network services.

In a network-based managed firewall service model, the service provider replaces the high-capacity access concentration router at the POP with an IP Service Processing Switch. This is higher-capacity, more robust, and more intelligent access switch, with scalable processing up to 100+RISC CPUs. Just as with the access router, additional customer access capacity is added via installing additional port access blades to the IP Service Processing Switch chassis. Unlike conventional access routers, however, additional processor blades are added to ensure wire-speed performance and service processing.

The intelligence resident in the IP Service Processing Switch eliminates the need to deploy CPE devices at each protected customer site. Deployment, configuration, and management of the managed firewall service all take place between the IP Service Processing Switch 230 and its Service Management System 221, which resides on a high-end UNIX platform at the service provider NOC. The customer also has the ability to initiate service provisioning and augmentation via a web-based Customer Network Management tool that typically resides at the customer's headquarters site. This is an entirely different service delivery paradigm, requiring minimal or no truck rolls or on-site intervention.

To roll out a managed network-based firewall service, the service provider's security staff provides a consultation to the enterprise, thereby gaining an understanding of the corporate network infrastructure and developing appropriate security policies (this is a similar process to the CPE model). Once this has been accomplished, the NOC security staff remotely accesses the IP Service Processing Switch (using the Service Management System 221) at the regional POP serving the enterprise customer, and the firewall service is provisioned and configured remotely.

This model enables the service provider to leverage the enterprise's existing services infrastructure (leased lines and Frame Relay PVCs) to deliver new, value-added services without the requirement of a truck roll. All firewall and VPN functionality resides on the IP Service Processing Switch at the POP, thus freeing the service provider from onsite systems integration and configuration and effectively hiding the technology from the enterprise customer. Firewall inspection and access control functions, as well as VPN tunneling and encryption, take place at the IP Service Processing Switch and across the WAN, while the enterprise's secure leased line or Frame Relay PVC (permanent virtual circuit) access link remains in place. The customer interface is between its router and the IP Service Processing Switch (acting as an access router), just as it was prior to the rollout of the managed firewall service. Additionally, the customer has visibility into and control over its segment of the network via the CNM that typically resides at the headquarters site.

TABLE 1

Comparison Between CPE-based and Network-based Managed Firewall Turn-up Processes

| Process | CPE-based Model | Network-based Model |
|---|---|---|
| Service Preparation | Security consultation to identify customer requirements/policies CPE device(s) ordered CPE device(s) preconfigured CPE device(s) shipped to customer site | Security consultation to identify customer requirements/policies |
| Service Rollout | Security technician deployed to site(s) OS/Firewall/VPN software loaded (server-based model) Physical network integration of device | Service provisioning and policy configuration deployed from NOC via Service Management System (SMS) - No truck roll needed |
| Additional Service Deployment | Repeat above for each additional service | Add configuration template to SMS and duplicate across all service points, provision with CNM - No truck roll |
| Maintenance/ Support | Technician on phone with customer testing CPE and technician at POP testing equipment | Technician at POP testing equipment |
| | Maintain inventory of spare units/components in service region Ship spares to customer site as needed Deploy technician to customer site to complete repairs if necessary | Order spares/replacement from central vendor repository - No truck roll necessary Integrate replacement unit component at POP |

The network-based firewall model also enables service providers to quickly and cost-effectively roll out managed firewall solutions at all enterprise customer sites. As a result, secure Internet access can be provided to every site, eliminating the performance and complexity issues associated with backhauling Internet traffic across the WAN to and from a centralized secure access point.

As the IP Service Delivery Platform is designed to enable value-added public network services, it is a carrier-grade system that is more robust and higher-capacity than traditional access routers, and an order of magnitude more scalable and manageable than CPE-based systems. The platform's Service Management System enables managed firewall services, as well as a host of other managed network services, to be provisioned, configured, and managed with point-and-click simplicity, minimizing the need for expensive, highly skilled security professionals and significantly cutting service rollout lead-times. The Service Management System is capable of supporting a fleet of IP Service Processing Switches and tens of thousands of enterprise networks, and interfaces to the platform at the POP from the NOC via IP address. Support for incremental additional platforms and customers is added via modular software add-ons. Services can be provisioned via the SMS system's simple point and click menus, as well as requested directly by the customer via the CNM system.

Deployment of a robust IP Service Delivery Platform in the carrier network enables service providers to rapidly turn-up high value, managed network-based services at a fraction of the capital and operational costs of CPE-based solutions. This enables service providers to gain a least-cost service delivery and support structure. Additionally, it enables them to gain higher margins and more market share than competitors utilizing traditional service delivery mechanisms—even while offering managed firewall services at a lower customer price point.

Business Case

This business case highlights the difference between traditional CPE-based managed firewall services (both appliance and server-based models) and managed, network-based firewall services. This comparison is based upon both capital costs and incremental operational or "soft" costs.

This business case is modeled around a theoretical North American service provider that is rolling out a managed firewall service. The service provider has ten regional Points of Presence (POPs) across the US, and a single Network Operations Center (NOC). The business case examines growth of the managed firewall service customer base yearly over a five-year period.

Assumptions
  Three unique customer profiles.
    5 site (4 branch sites+headquarters)
    50 site (49 branch sites+headquarters)
    200 site (199 branch sites+headquarters)
  Each unique customer profile has the following access requirements
    5 site customers
      branch sites—56Kbps
      headquarters—T1
    50 site customers
      branch sites—56Kbps
      headquarters—T1
    200 site customers
      branch sites—128Kbps
      headquarters—T3
  Greater than 500 employees at 200 site customers' headquarters
  Less than 500 employees at 5 site and 50 site customers' headquarters
  Static Model—bandwidth will not change over time
  Equal distribution of customers across each of the ten POPs
  a traditional multiplexer resides at each POP to aggregate access circuits up to channelized T3 interfaces in both the access router and the IP Service Processing Switch
  No oversubscription through the access router/IP Service Processing Switch (ingress bandwidth=egress bandwidth)
  An initial consultation to define customer security requirements and policies has taken place
  Each customer site has router in place
  List pricing (no discounts) as of January 2000

$150/hour billable rate for mid-level security specialist

When to Deploy Network-based vs. CPE-based Firewall Services

The cost benefits of a managed, network-based Firewall Service Model becomes apparent when Service Providers are deploying managed firewall services to more than twenty-nine enterprise sites. By examining the hardware and software costs alone, a network-based model becomes more cost effective to Service Providers as they begin to roll services to more than thirty sites.

A Check Point firewall solution. (one based on Check Point hardware) would cost Service Providers $478,000 to support thirty enterprise sites; whereas, a network-based firewall solution using the IP Service Delivery supports thirty enterprise sites for $450,000 with the ability to support an additional twenty-five sites without an increase in cost. If the Service Provider wanted to deploy services to twenty-five additional sites using a Check Point solution, the total cost of support fifty-five sites would be $835,000. . . $385,000 more than the network-based IP Service Delivery Platform. The savings of the network-based solution would continue to scale as additional sites were added incrementally.

If the enterprise customer does not have a Cisco 7513 or a comparable router installed at these sites, Service Providers would be forced to incur even greater initial start-up costs with the Check Point solution. If routers were to be installed at each enterprise site, the network-based Firewall solution would become the more cost-effective alternative when Service Providers needed to roll out services to more than twenty-one enterprise sites.

Business Case—Models

This business case will explore four specific managed firewall service delivery architectures as described by interviewed service providers, systems integrators, and hardware/software vendors.

CPE-based Models

Architecture One Check Point/Nokia Appliance

This architecture employs a firewall/VPN CPE appliance, traditional access router, and software-based centralized management system to deliver a managed firewall solution. The specific components of this solution include:

Check Point/Nokia VPN-1/IP-330 appliance (50 user license) at branch sites

Check Point VPN-1/Firewall-1 software module (unlimited user license) on Sun Enterprise Ultra 250 server platform at headquarters Cisco 7513 access router at the service provider's POP (redundant power, redundant RSP4)

Check Point Provider-1 management system at the service provider's NOC (supports 50 customers/ module) with unlimited sites/customer on Sun Ultra 60 platform at Network Operations Center (NOC)

Figure 10:
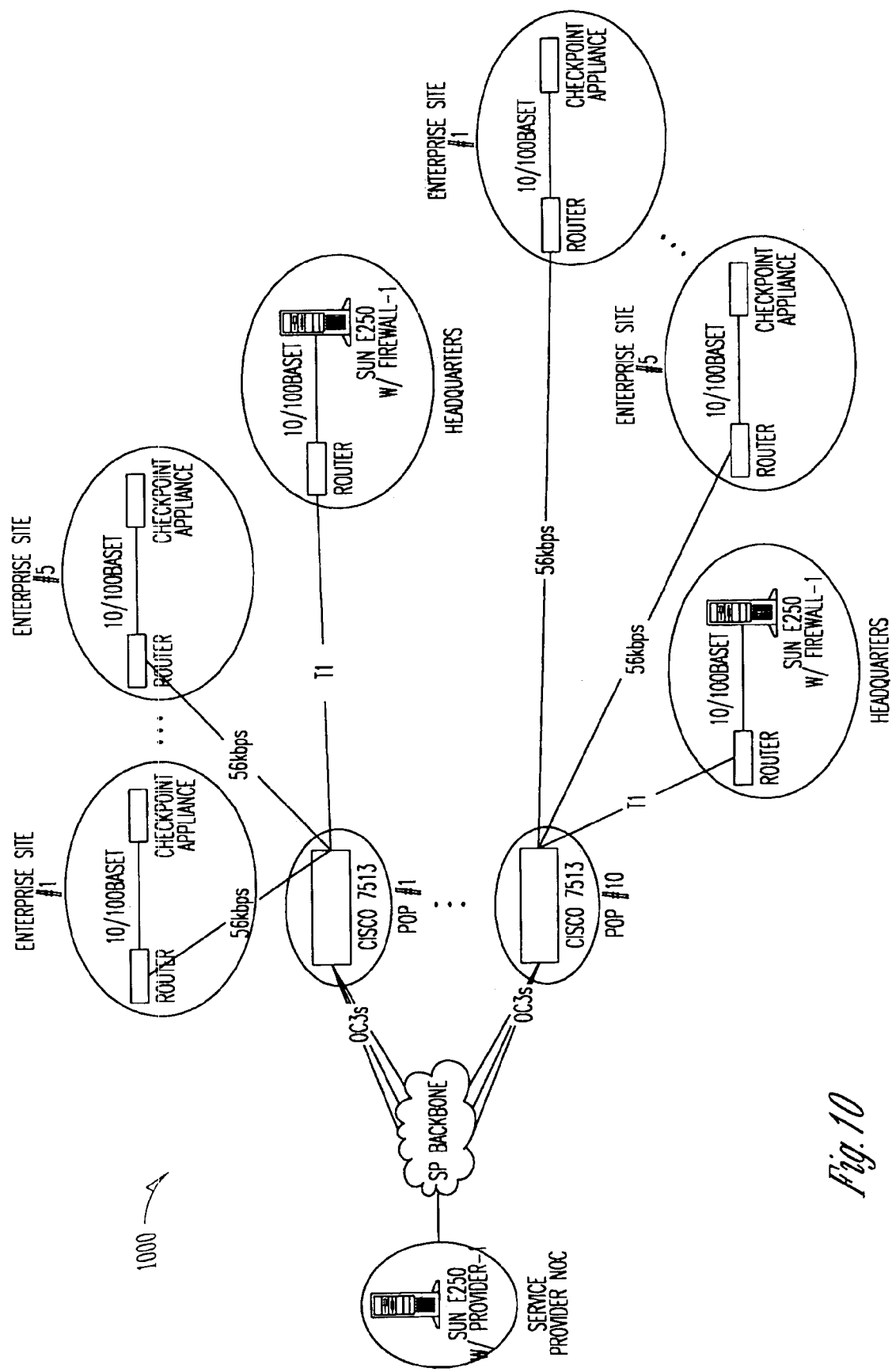
FIG. 10 shows a block diagram of a system 1000 for comparison.

FIG. 10 shows a block diagram of a system 1000 providing a Managed Firewall Service with a CheckPoint/Nokia Appliance Solution Architecture Two: Check Point Server This architecture employs a firewall/WPN CPE server, traditional access router, and software-based centralized management system to deliver a managed firewall solution. The specific components of this solution include:

Check Point VPN-1/Firewall-1 software module (50 user license) on Sun 5S server platform at branch sites Check Point VPN-1/Firewall-1 software module (unlimited user license) on Sun Enterprise Ultra 250 server platform at headquarters Cisco 7513 access router at the service provider POP (redundant power, redundant RSP4)

Figure 11:
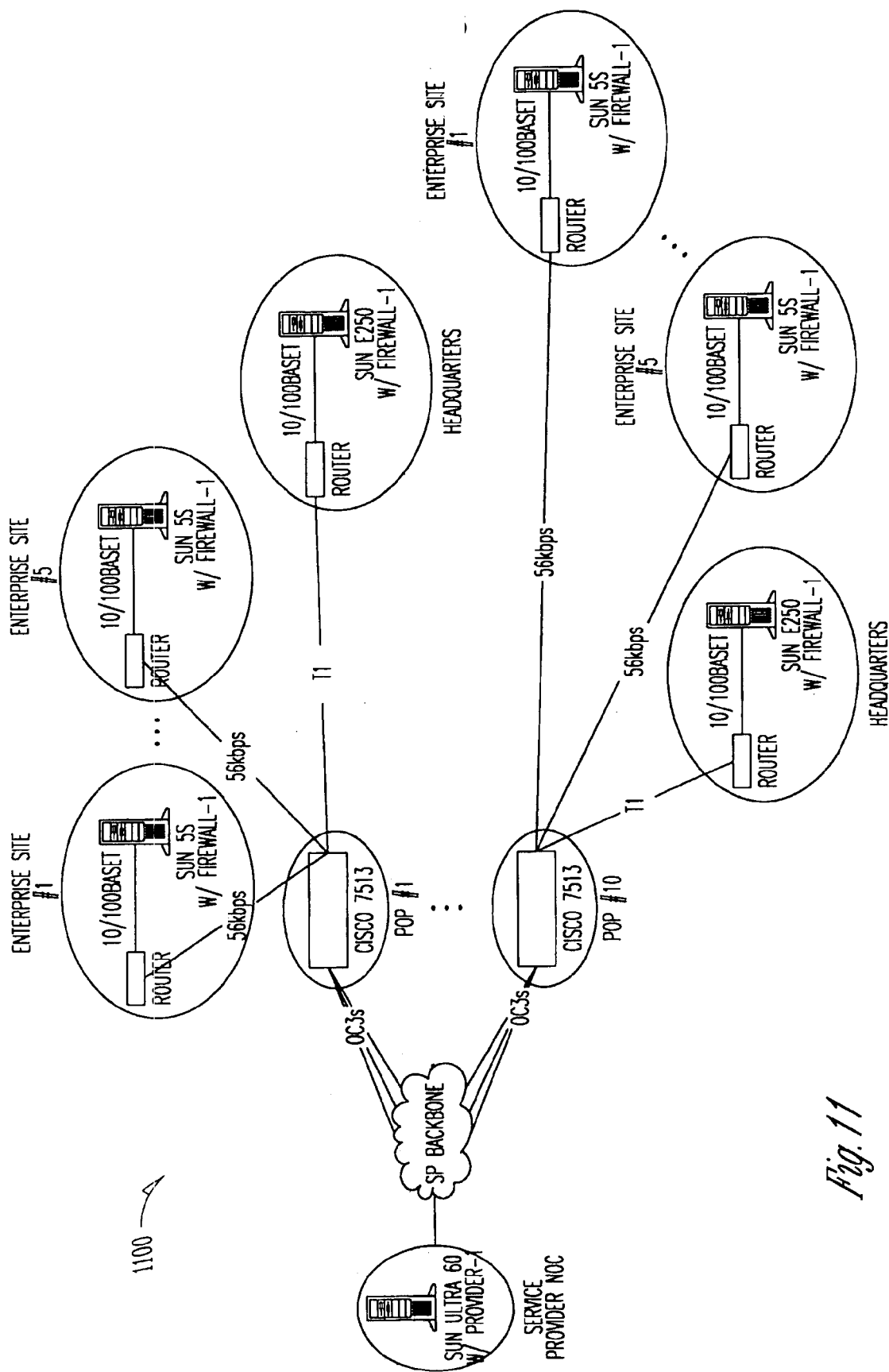
FIG. 11 shows a block diagram of a system 1100 for comparison.

Check Point Provider-1 management system (supports 50 customers/module) with unlimited sites/customer on Sun Ultra 60 platform at NOC FIG. 11 shows a block diagram of a system 1100, providing a Managed Firewall Service with a CheckPoint Firewall-1 Server-based Solution.

Architecture Three WatchGuard Appliance Model

This architecture employs a firewall/VPN CPE appliance, traditional access router, and software-based centralized management system to deliver a managed firewall solution. The specific components of this solution include:

WatchGuard Firebox II Plus appliance at branch sites

Cisco 7513 access router at the service provider POP (redundant power, redundant RSP4)

Figure 12:
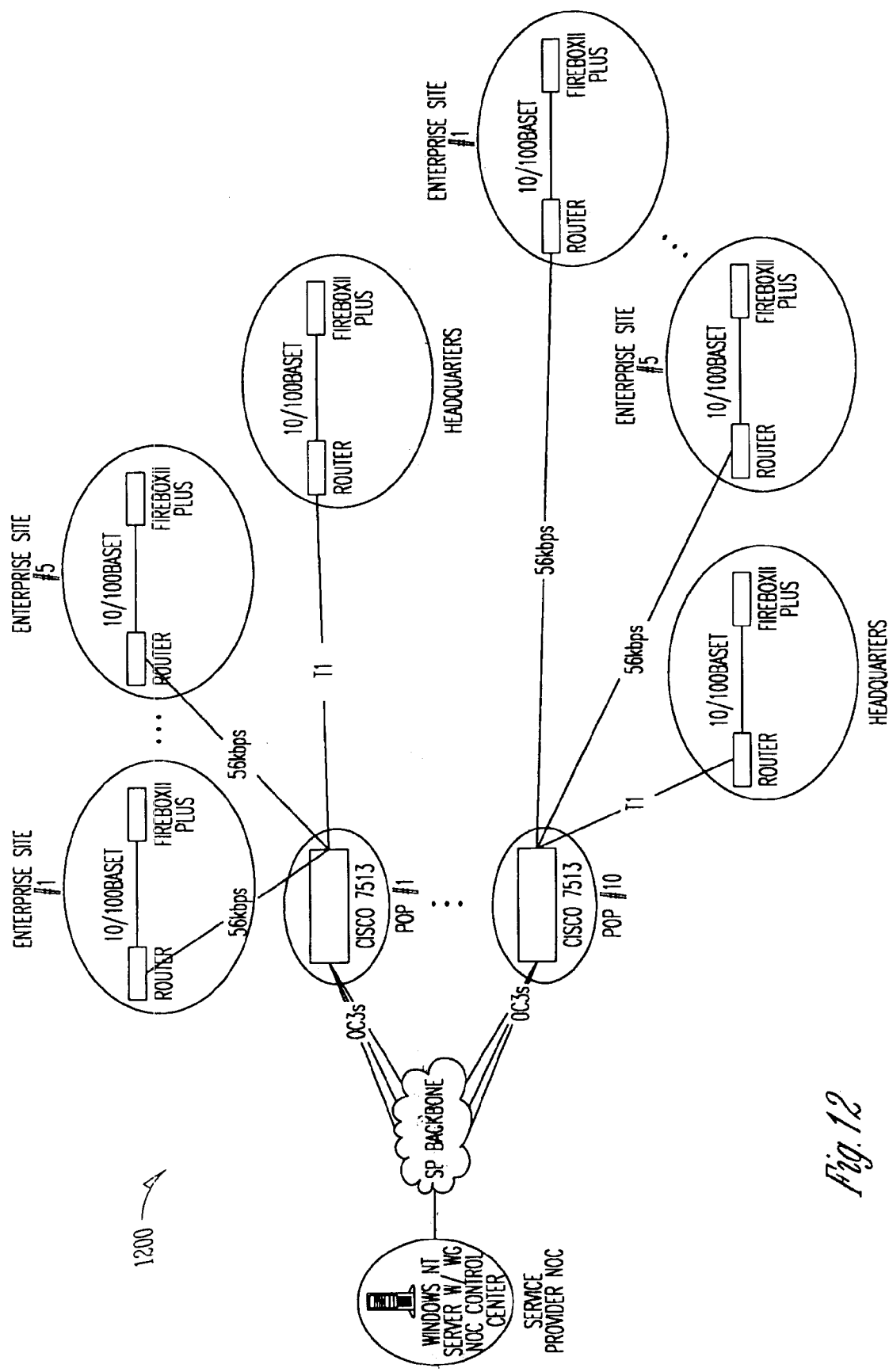
FIG. 12 shows a block diagram of a system 1200 for comparison.

WatchGuard for MSS management system (supports 500 customers/module) with unlimited sites/customer on Compaq Proliant 3000 Windows NT workstation platform, Event Processor on Sun Microsystems 5S server platform FIG. 12 shows a block diagram of a system 1200, providing a Managed Firewall Service with a WatchGuard Appliance Solution. The CPE-based managed firewall service model requires installation and configuration of system components at three network points: the service provider POP, the service provider NOC, and the customer premises.

POP Infrastructure

Each of the three CPE-based architectures explored in this analysis employs an identical POP infrastructure. This access infrastructure is based on the Cisco 7513 router. The base configuration for the 7513 includes:

13-slot chassis

IOS Service Provider system software (2) power supplies (2) Route Switch Processors (RSP4)

(2) RSP4 128MB DRAM Option (2) RSP4 20MB Flash Card Option 2-port Fast Ethernet Card 64MB DRAM Option 8MB SRAM Option The RSP4 cards in this base configuration each consume one slot in the chassis, leaving 11 remaining for port adapters. An Ethernet card is added for software uploads. Ingress traffic is supported via dual-port channelized and/or dual-port unchannelized T3 cards (for dedicated T3 connections). Each channelized T3 port can support up to 128 DSO or NxT1 channels Single-port OC-3 POS cards provide connectivity to the network uplink on the egress side. These cards each occupy a single slot. Each card requires a programmable Versatile Interface Processor (VIP2), as well as an additional 64MB of DRAM and 8MB of SRAM. The VIP2 and additional memory reside on the T3/OC-3 cards and do not consume additional slots.

As described in the assumptions, a traditional multiplexer exists at each POP to aggregate various sub-T1 customer access links up to the channelized T3 interfaces on the Cisco 7513 router. As the POP infrastructure installation and configuration processes are uniform across all managed firewall service models explored in this analysis, the costs associated with these processes will not be quantified.

Network-Based Model of the Present Invention—Architecture Four

IP Service Delivery Platform 300 that includes an IP Service Processing Switch (IPSX 230), a Service Management System (SMS 221) and a Customer Network Management System (CNMS 222).

This architecture employs an IP Service Processing Switch and a software-based centralized SMS to deliver a managed firewall solution. The specific components of this solution include:

IPSX 230 (IP Service Processing Switch) at service provider POP

Service Management System 221 on Sun Ultra 60 server at service provider NOC

InGage™ Customer Network Management System at the subscriber's headquarters

Figure 13:
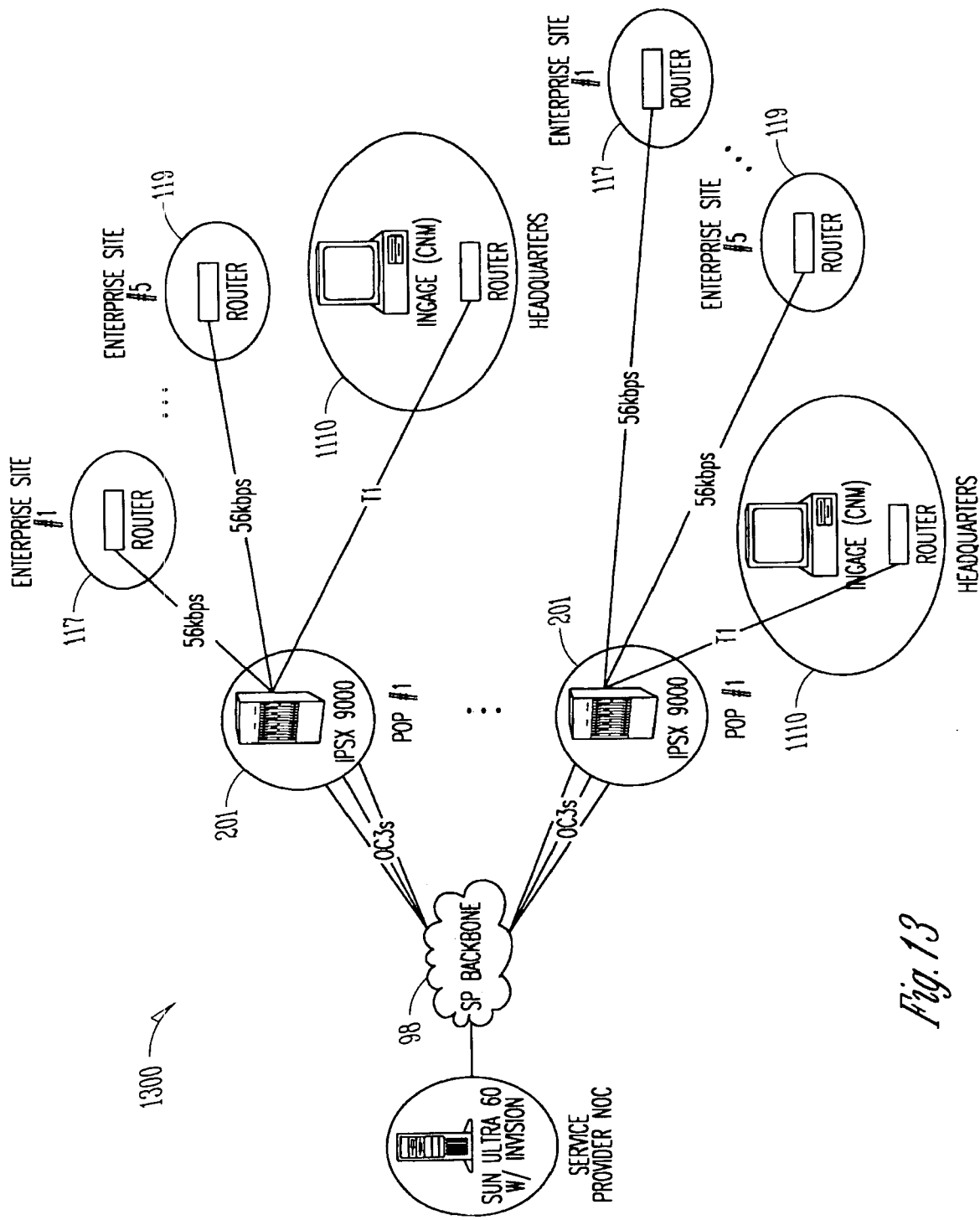
FIG. 13 shows a block diagram of a system 1300 for comparison.

FIG. 13 shows a block diagram of a system 1300 that provides a Managed Firewall Service with CoSine's Network-based Solution of the present invention.

POP Infrastructure

The POP access infrastructure in the network-based managed firewall service model is based on the CoSine Communications IPSX 9000 Service Processing Switch. The base configuration for the switch includes:

26-slot chassis
Redundant power supply
IPNOS Base Software
Ring Bridge & Ring Bridge Pass-Thru (to complete midplane)
Control Blade (for communications with Invision Services Management System)
Dual-port Channelized DS3 Access Blade
Dual-port Unchannelized DS3 Access Blades
Processor Blade
OC-3c POS Trunk Blade The following tables analyze the cost structure of all of the above models and projects these costs out over 5 years:

TABLE 2

Capital Cost Summary for First Year Deployment of the Four Managed Firewall Scenarios

| Firewall implementation scenarios | Year | Total Customers* | Cost |
|---|---|---|---|
| Solution 1 Check Point Appliance | | | |
| Checkpoint Provider 1 (management system) | 1 | 90 | $.9 M |
| Check Point/Nokia 10 POP Appliance | 1 | 90 | $37 M |
| Total Check Point #1 w/0 Cisco | | | $37.9 M |
| Adding Cisco to Checkpoint | 1 | 90 | + $2 M |
| Total Check Point + Cisco | | | $39.9 M |
| Solution 2 Check Point Server | | | |
| Checkpoint Provider 1 (management system) | 1 | 90 | $.9 M |
| Checkpoint Nokia 10 POP Server | 1 | 90 | $31 M |
| Total Check Point #2 | | | $31.9 M |
| Adding Cisco to CheckPoint | 1 | 90 | + $2 M |
| Total Check Point + Cisco | | | $33.9 M |

TABLE 2-continued

Capital Cost Summary for First Year Deployment of the Four Managed Firewall Scenarios

| Firewall implementation scenarios | Year | Total Customers* | Cost |
|---|---|---|---|
| Solution 3 WatchGuard | | | |
| WatchGuard 10 POP Appliance Model | 1 | 90 | $14 M |
| WatchGuard NOC Appliance Model Management | 1 | 90 | $.07 |
| Total WatchGuard | | | $14.07 M |
| Adding Cisco to WatchGuard | 1 | 90 | + $2 M |
| Total WatchGuard + Cisco | | | $16.07 M |
| Solution 4 CoSine | | | |
| CoSine 10 POP Model (IPSX 9000) | 1 | 90 | $12 M |
| CoSine NOC (Invision Service Management System) | 1 | 90 | $1.2 M |
| Total CoSine Solution $13.2 M | | | $13.2 M |
| Savings over Check Point #1 | 1st year | | $39.9 − $13.2 = $26.7 M |
| Savings over Check Point #2 | 1st year | | $31.9 − $13.2 = $18.7 M |
| Savings over WatchGuard | 1st year | | $16.07 − $13.2 = $2.87 M |

Capital Costs spread - first year.
*Total number of customers is based on a spread across 5, 50 and 200 site configurations.
Pricing listed is based on information from January of 2000 and is subject to change.

Pricing listed is based on information from January of 2000 and is subject to change.

TABLE 3

Capital Cost Summary for the Fifth Year Deployment of the Four Managed Firewall Scenarios

| Firewall implementation scenarios | Year | Total Customers* | Cost |
|---|---|---|---|
| 1. Solution 1 Check Point Appliance | | | |
| CheckPoint Provider 1 (management system) | 5 | 1880 | $3.8 M |
| Check Point/Nokia 10 POP Appliance | 5 | 1880 | $692 M |
| Total Check Point #1 w/0 Cisco | | | $705.8 M |
| Adding Cisco to CheckPoint | 5 | 1880 | + $26 M |
| Total Check Point + Cisco | | | $731.8 M |

TABLE 3-continued

Capital Cost Summary for the Fifth Year Deployment of the Four Managed Firewall Scenarios

| Firewall implementation scenarios | Year | Total Customers* | Cost |
|---|---|---|---|
| 2. Solution 2 Check Point Server | | | |
| CheckPoint Provider 1 (management system) | 5 | 1880 | $3.8 M |
| CheckPoint Nokia 10 POP Server | 5 | 1880 | $590 M |
| Total Check Point #2 | | | $593.8 M |
| Adding Cisco to CheckPoint | 5 | 1880 | $26 M |
| Total Check Point + Cisco | | | $619.8 M |
| 3. Solution 3 WatchGuard | | | |
| WatchGuard 10 POP Appliance Model | 5 | 1880 | $268 M |
| WatchGuard NOC Appliance Model Management | 5 | 1880 | $.25 |
| Total WatchGuard | | | $268.25 M |
| Adding Cisco to WatchGuard | 5 | 1880 | $26 M |
| Total WatchGuard + Cisco | | | $294.25 M |
| 4. Solution 4 CoSine | | | |
| CoSine 10 POP Model (IPSX 9000) | 5 | 1880 | $106 M |
| CoSine NOC (Invision Service Management System) | 5 | 1880 | $1.2 M |
| Total CoSine Solution | | | $107.2 M |
| Savings over Check Point #1 | 5th year | | $731.8 − $107.2 = $624.6 M |
| Savings over Check Point #2 | 5th year | | $619.8 − $107.2 = $512.6 M |
| Savings over WatchGuard | 5th year | | $294.25 − $107.2 = $187.05 M |

Capital Costs spread - fifth year
*Total number of customers is based on a spread across 5, 50 and 200 site configurations.
Pricing listed is based on information from January of 2000 and is subject to change.

Analysis

Analysis of the four service delivery architectures for deploying a managed firewall service reveals extremely compelling data in favor of implementing the network-based model based on the CoSine Communications IP Service Delivery Platform. Significant advantages are gained by utilizing this model in each of the following areas:

Operational "soft" Costs

Figure 14:
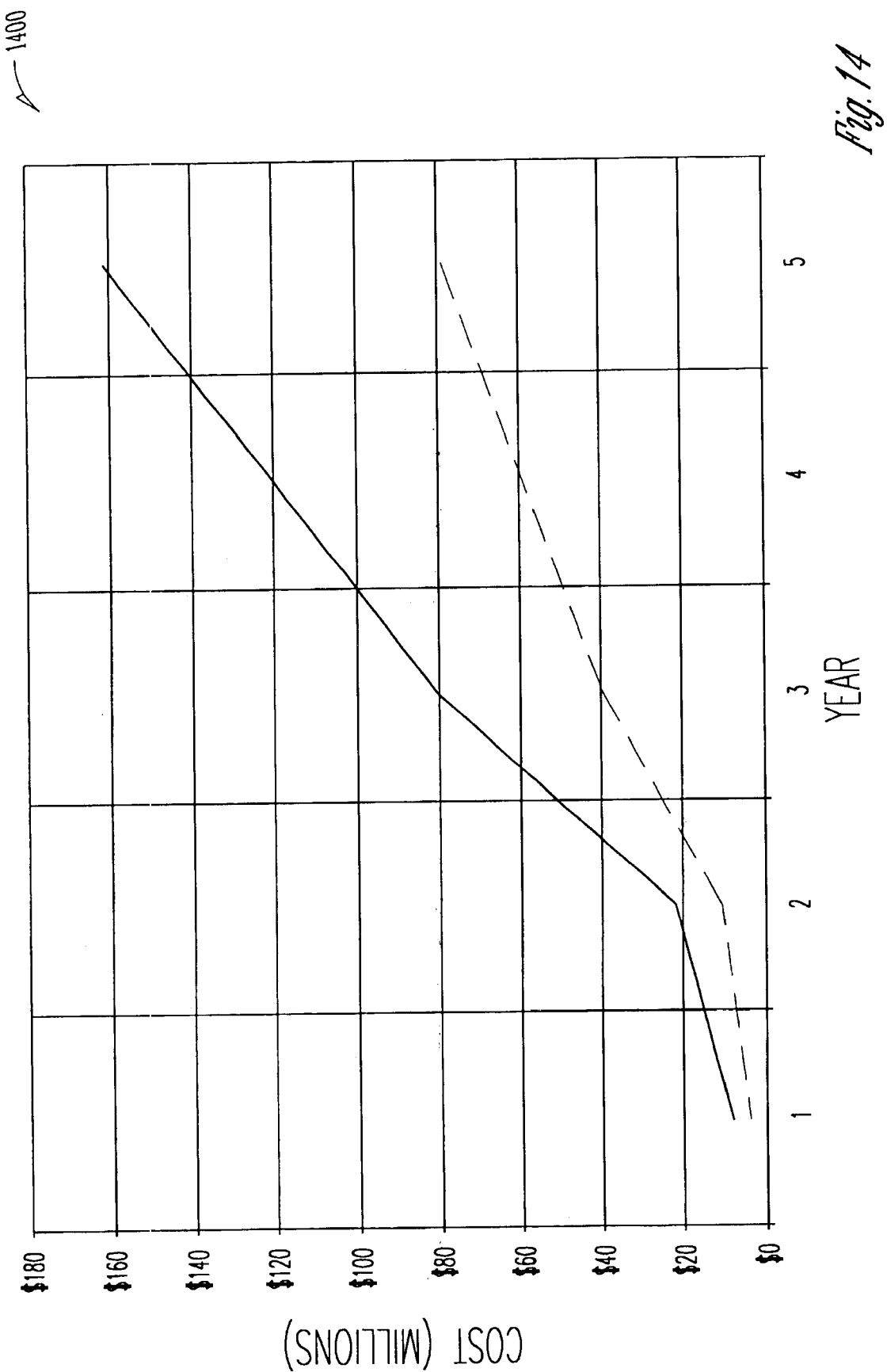
FIG. 14 shows a graph of CheckPoint operational "soft" costs 1400.

The network-based managed firewall solution eliminates most of the steep operational costs that are associated with deploying a CPE-based solution, specifically the per site truck roll and device installation charges. The CheckPoint server-based CPE deployment and installation operational costs alone exceed the total five-year capital equipment investment required in the CoSine Communications network-based model. These costs 1400 are shown in FIG. 14. Though the installation and configuration costs for the POP and NOC build-outs are not quantified in this study due to the uniformity of these processes across all solutions, it is worthy to note that the greater capacity of the CoSine IPSX 9000 Service Processing Switch and Invision Service Management System result in fewer components (switch chassis, NOC servers and software) that need to be installed and configured.

FIG. 14 shows a graph CheckPoint Operational "soft" Costs 1400. This chart represents only operational costs associated with the Check Point CPE appliance and server models. In the context of this model, there are no soft costs associated with the CoSine Communications network-based model or the WatchGuard CPE appliance model.

| Truck Roll | Security Tech/hr | Server Installation (hr) | Appliance Installation (hr) |
|---|---|---|---|
| $500 | $150 | 12 | 4 |

*Assumptions for "soft" cost calculations.

Capital Costs

The network-based managed firewall solution has total capital costs that, over the five-year customer grow th period of this study, are an order of magnitude less than the CPE-based solutions. The total capital costs for each solution are shown in FIG. 15.

Figure 15:
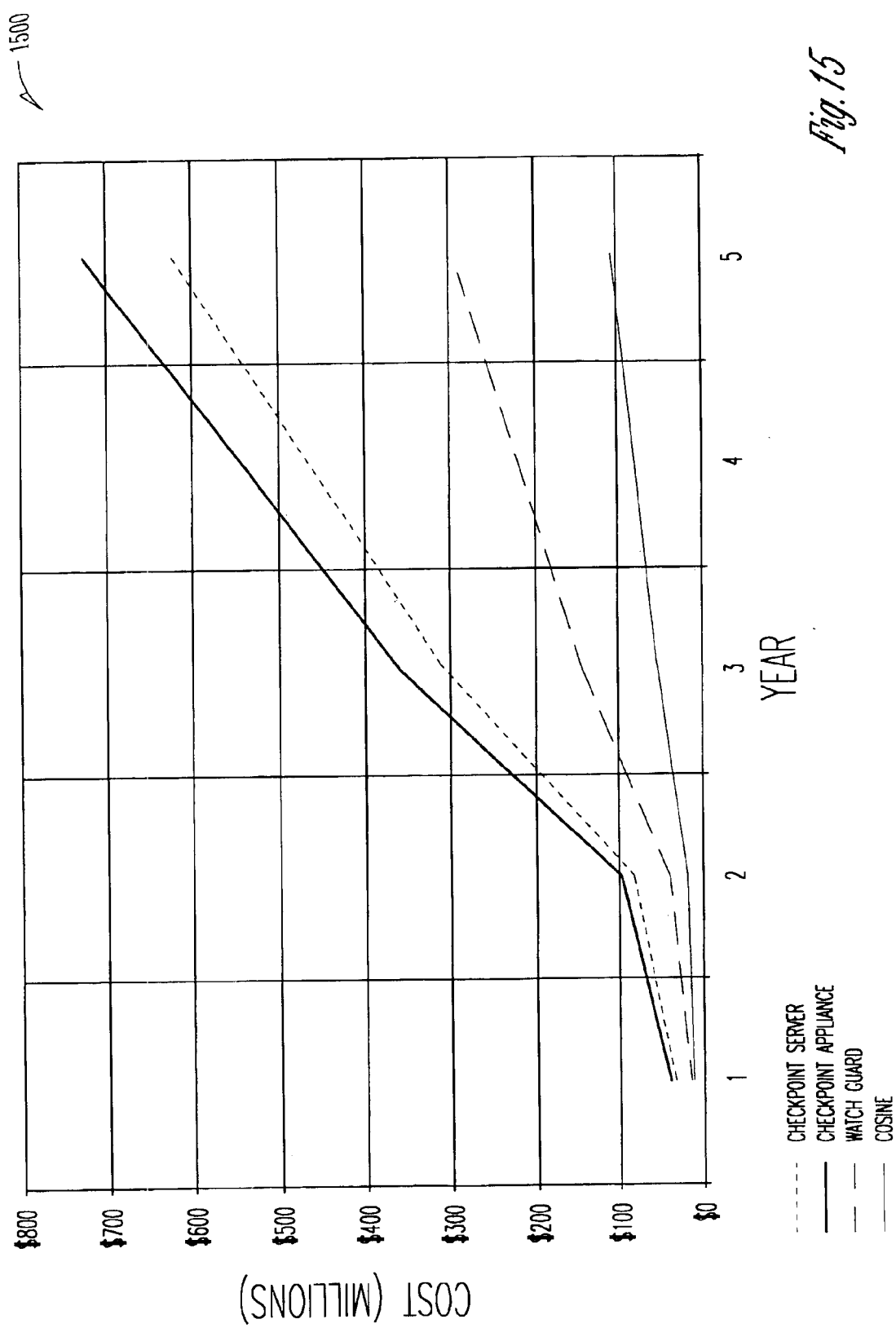
FIG. 15 shows a graph of five year total capital cost 1500.

FIG. 15 shows a graph of five year total capital cost 1500.

Time to Market, Time to Revenue

The network-based managed firewall solution enables service providers to greatly shorten the lead-time required to deploy the managed firewall service. The removal of the CPE component from the service offering eliminates the need to procure the device, eliminating a 1–2 week delay in service rollout. This also eliminates the 2–4 week delay that is associated with scheduling an onsite installation.

Complexity

The network-based managed firewall solution greatly reduces the complexity associated with deploying the service. The number of distributed devices is reduced from thousands of remote customer sites to only 10 already staffed POPs, simplifying management and maintenance significantly.

The network-based managed firewall service model creates a new source of revenue for service providers that is scalable, repeatable, and cost-effective. Leveraging centrally-managed services enables service providers to derive greater value from the existing basic access infrastructure. The network-based model eliminates expensive onsite installation and maintenance required of CPE-based solutions, and provides a foundation to deploy additional value-added services via the same delivery mechanism. Elimination of the CPE device also effectively hides the technology of the managed firewall solution from the customer, reducing internal network complexity and technical anxiety.

The CoSine Communications IP Service Delivery Platform 300 enables service providers to reap the benefits of deploying a network-based managed firewall service. The IPSX 9000 Service Processing Switch is a robust, high-availability platform that is capable of supporting hundreds of customer sites and network-based firewalls. The Invision Services Management System is capable of rapidly provisioning and managing thousands of managed firewall customers throughout an extensive nationwide network, enabling service providers to leverage volume security services driven by fewer staff resources. And the InGage™ Customer Network Management System empowers customer IT managers to view and augment managed network services. The IP Service Delivery Platform positions service providers to continuously deploy new value-added services to their customer base, maximizing revenues and creating customer lock-in.

Service providers utilizing the IP Service Delivery Platform 300 are to gain a significant competitive edge in deploying high-value IP-based services. The CoSine Communications solution of the present invention enables services providers to save up to 85% on the capital costs associated with deploying a managed firewall service over traditional CPE-based approaches. Additionally, the CoSine solution of the present invention virtually eliminates the steep operational "soft" costs that plague the CPE approach, which total $79–161M in the 5-year model architecture. These savings add up to literally tens to hundreds of millions of dollars over a five-year period. Furthermore, as customer numbers and bandwidth requirements increase over time, so do the cost savings. This enables service providers to gain a cost-leadership position while greatly increasing revenues.

In closing, the IP Service Delivery Platform (IPSDP 300) is an ideal solution for service providers seeking to offer high value managed, network- based firewall services.

In some embodiments, a set of one or more management consultants to the networking industry help equipment vendors, service providers and enterprises make strategic decisions, mitigate risk and affect change through business and technology consulting engagements. This approach is tailored to each client's specific issues, objectives and budget.

These consultants are leaders in the networking industry and influence its direction though confidential engagements for industry leaders and through public appearances and trade magazine articles. These interactions assure clients that they will be among the first to know of the latest industry concepts and emerging technology trends.

Each consulting engagement is uniquely structured—no forced methodologies or canned reports are employed. An integrated client/management consultant case team respecting and soliciting the opinions of everyone is formed for each engagement.

The present invention provides a. flexible, scalable hardware and software platform that allows a service provider to easily provide internet services, virtual private network services, firewall services, etc., to a plurality of customers. This solution can be changes to provision each customer with more or less processing power and storage, according to individual changing needs.

One aspect of the present invention provides a method of delivering security services. This method includes connecting a plurality of processors 930 in a ring configuration within a first processing system, establishing a secure connection between the processors in the ring configuration across an internet protocol (IP) connection to a second processing system to form a tunnel, and providing both router services and host services for a customer using the plurality of processors in the ring configuration and using the second processing system.

In some embodiments, one or more processors In some embodiments, to support a communications network, the plurality of processors includes one or more control processors, one or more access processors, and one or more processing processors.

In some embodiments, for each of a plurality of customers, a virtual router 210 is formed in the first processing system 401 and is operably connected to a virtual router 210 formed in the second system 402.

In some embodiments, for each of a plurality of customers, a virtual private network 410 is formed using a virtual router 210 formed in the first processing system 401 and operably connected to a virtual router 210 formed in the second system 402.

In some embodiments, the connecting a plurality of processors in the ring configuration includes forming dual counter rotating ring connections 933 and 934, each connecting to each of the plurality of processors 930.

Another aspect of the present invention provides a system of delivering security services. This system 201 includes a plurality of processors 230 in a ring configuration within a first processing system 401, and means for establishing a secure connection 418 between the processors in the ring configuration 411 across an internet protocol (IP) connection to a second processing system 412 to form a tunnel, and for providing both router services and host services for a customer using the plurality of processors in the ring configuration 411 and using the second processing system 412.

In some embodiments, to support a communications network, the plurality of processors includes one or more control processors, one or more access processors, and one or more processing processors.

In some embodiments, for each of a plurality of customers, a virtual router is formed in the first processing system and is operably connected to a virtual router formed in the second system.

In some embodiments of this system, for each of a plurality of customers, a virtual private network is formed using a virtual router formed in the first processing system and operably connected to a virtual router formed in the second system.

In some embodiments of this system, the plurality of processors in the ring configuration includes dual counter rotating ring connections, each connecting to each of the plurality of processors.

Yet another aspect of the present invention provides a system 201 for delivering security services. This second system 201 includes a plurality of processors within a first processing system connected in a ring configuration, and a tunnel formed using a secure connection between the processors in the ring configuration across an internet protocol (IP) connection to a second processing system, wherein both router services and host services are provided for a customer using the plurality of processors in the ring configuration and using the second processing system.

In some embodiments of this second system, to support a communications network, the plurality of processors 930 includes one or more control processors 234, one or more access processors 238, and one or more processing processors 236. In some embodiments, one or more of these processors is packaged on a blade 239.

In some embodiments of this second system, for each of a plurality of customers, a virtual router 210 is formed in the first processing system 401 and is operably connected to a virtual router 210 formed in the second system 402.

In some embodiments of this second system, for each of a plurality of customers, a virtual private network 410 is formed using a virtual router 210 formed in the first processing system 401 and operably connected to a virtual router 210 formed in the second system 410.

In some embodiments of this second system, the plurality of processors 230 in the ring configuration includes dual counter rotating ring connections 932 and 933, each connecting to each of the plurality of processors 930.

Some embodiments of this second system further include a services management system 221 that provides changeable provisioning of processor capacity among a plurality of customers.

Some embodiments of this second system further include a services management system 221 that provides firewall protection for each of a plurality of customers.

Some embodiments of this second system further include a services management system 221 that provides provisioning of processor capacity among a plurality of customers, wherein each customer's resources are isolated from those of all the other customers.

Conclusion

One aspect of the present invention provides a method of packet routing. The method includes connecting a plurality of processors in a network, assigning a unique processor identifier (PEID) to each of the processors, routing a first packet to a first one of the processors across the network, wherein each such packet includes a PEID value corresponding to a PEID of one of the processors, and wherein the routing to the first processor is based on the PEID value in the first packet, establishing a plurality of objects in the first processor, assigning a logical queue identifier (LQID) to a first one of the objects in the first processor, wherein each packet also includes an LQID value corresponding to an LQID of one of the objects, and routing the first packet to the first object based on the LQID value in the first packet.

Some embodiments further include assigning a plurality of different LQIDs to the first object.

Some embodiments further include routing a plurality of packets, each having a different LQID, to the first object based on the LQID value in each respective packet.

In some embodiments, the first object is associated with a virtual router (VR).

Some embodiments further include establishing the first LQID with the first object to be used for point-to-point data traffic, and establishing a second LQID with the first object to be used for shortcut data traffic.

In some embodiments, the network is configured in a ring topology.

Another aspect of the present invention provides a system for routing packets. This system includes a plurality of processors coupled to one another using a network, wherein each of the processors a unique processor identifier (PEID), wherein a first packet is routed into a first one of the processors across the network, wherein each such packet includes a PEID value corresponding to a PEID of one of the processors, and wherein the routing to the first processor is based on the PEID value in the first packet, a plurality of objects in the first processor, wherein each such object is assigned a logical queue identifier (LQID), wherein each packet also includes an LQID value corresponding to an LQID of one of the objects, and software for routing the first packet to the first object based on the LQID value in the first packet.

In some embodiments, a plurality of different LQIDs are simultaneously assigned to the first object.

In some embodiments, the means for routing includes means for routing a plurality of packets, each having a different LQID, to the first object based on the LQID value in each respective packet:

In some embodiments, the first object is associated with a virtual router (VR).

In some embodiments, the first LQID is associated with the first object to be used for point-to-point data traffic, and a second LQID is associated with the first object to be used for shortcut data traffic.

In some embodiments, the network is configured in a ring topology.

Still another aspect of the present invention provides a system for routing packets. This system includes a plurality of processors coupled to one another using a network, wherein each of the processors a unique processor identifier (PEID), wherein a first packet is routed into a first one of the processors across the network, wherein each such packet includes a PEID value corresponding to a PEID of one of the processors, and wherein the routing to the first processor is based on the PEID value in the first packet, and a plurality of objects in the first processor, wherein each such object is assigned a logical queue identifier (LQID), wherein each packet also includes an LQID value corresponding to an LQID of one of the objects, wherein the first packet is routed to the first object based on the LQID value in the first packet.

Some embodiments further include a services management system that provides changeable provisioning of processor capacity among a plurality of customers.

Some embodiments further include a services management system that provides firewall protection for each of a plurality of customers.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of packet routing, comprising:

connecting a plurality of processors in a network;

assigning a unique processor identifier (PEID) to each of the processors;

routing a first packet to a first one of the processors across the network, wherein each such packet includes a PEID value corresponding to a PEID of one of the processors, and wherein the routing to the first processor is based on the PEID value in the first packet;

establishing a plurality of objects in the first processor;

assigning a logical queue identifier (LQID) to a first one of the objects in the first processor, wherein each packet also includes an LQID value corresponding to an LQD of one of the objects; and routing the first packet to the first object based on the LQID value in the first packet.

2. The method of claim 1, further comprising assigning a plurality of different LQIDs to the first object.

3. The method of claim 2, further comprising routing a plurality of packets, each having a different LQID, to the first object based on the LQID value in each respective packet.

4. The method of claim 1, wherein an object is associated with a virtual router (VR).

5. The method of claim 1, further comprising:

establishing the first LQID with the first object to be used for point-to-point data traffic; and establishing a second LQID with the first object to be used for shortcut data traffic.

6. The method of claim 1, wherein the network is configured in a ring topology.

7. A system for routing packets, comprising:

a plurality of processors coupled to one another using a network, wherein each of the processors a unique processor identifier (PEID), wherein a first packet is routed into a first one of the processors across the network, wherein each such packet includes a PEID value corresponding to a PEID of one of the processors, and wherein the routing to the first processor is based on the PEID value in the first packet;

a plurality of objects in the first processor, wherein each such object is assigned a logical queue identifier (LQID), wherein each packet also includes an LQID value corresponding to an LQD of one of the objects; and means for routing the first packet to the first object based on the LQID value in the first packet.

8. The system of claim 7, wherein a plurality of different LQIDs are simultaneously assigned to the first object.

9. The system of claim 8, wherein the means for routing includes means for routing a plurality of packets, each having a different LQID, to the first object based on the LQID value in each respective packet.

10. The system of claim 7, wherein the first object is associated with a virtual router (VR).

11. The system of claim 7, wherein the first LQID is associated with the first object to be used for point-to-point data traffic, and a second LQID is associated with the first object to be used for shortcut data traffic.

12. The system of claim 7, wherein the network is configured in a ring topology.

13. A system for routing packets, comprising:

a plurality of processors coupled to one another using a network, wherein each of the processors a unique processor identifier (PEID), wherein a first packet is routed into a first one of the processors across the network, wherein each such packet includes a PEID value corresponding to a PEID of one of the processors, and wherein the routing to the first processor is based on the PEID value in the first packet;

a plurality of objects in the first processor, wherein each such object is assigned a logical queue identifier (LQID), wherein each packet also includes an LQID value corresponding to an LQID of one of the objects, wherein the first packet is routed to the first object based on the LQID value in the first packet.

14. The system of claim 13, wherein a plurality of different LQIDs are simultaneously assigned to the first object.

15. The system of claim 14, wherein the a plurality of packets, each having a different LQID, are routed to the first object based on the LQID value in each respective packet.

16. The system of claim 13, wherein the first object is associated with a virtual router (VR).

17. The system of claim 13, wherein the first LQID is associated with the first object to be used for point-to-point data traffic, and a second LQID is associated with the first object to be used for shortcut data traffic.

18. The system of claim 13, wherein the network is configured in a ring topology.

19. The system of claim 13, further comprising:

a services management system that provides changeable provisioning of processor capacity among a plurality of customers.

20. The system of claim 13, further comprising:

a services management system that provides firewall protection for each of a plurality of customers.

* * * * *